United States Patent
Maekawa

(10) Patent No.: US 10,771,588 B2
(45) Date of Patent: Sep. 8, 2020

(54) SERVICE PROVIDING DEVICE AND PROGRAM THAT ARE CAPABLE OR PROVIDING A RELATIVELY LARGE NUMBER OF SERVICES

(71) Applicant: Konica Minolta Inc., Tokyo (JP)

(72) Inventor: Hiroaki Maekawa, Kawanishi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/384,551

(22) Filed: Apr. 15, 2019

(65) Prior Publication Data

US 2019/0327333 A1    Oct. 24, 2019

(30) Foreign Application Priority Data

Apr. 20, 2018   (JP) ................. 2018-081350

(51) Int. Cl.
*H04L 29/08*  (2006.01)

(52) U.S. Cl.
CPC .............. *H04L 67/32* (2013.01); *H04L 67/10* (2013.01)

(58) Field of Classification Search
CPC .................. H04L 67/32; H04L 67/10
See application file for complete search history.

(56) References Cited

U.S. PATENT DOCUMENTS

| | | | | |
|---|---|---|---|---|
| 9,253,228 B2 * | 2/2016 | Lee | ..................... | H04L 65/4069 |
| 2008/0316529 A1 | 12/2008 | Hamatani | | |
| 2013/0117806 A1 * | 5/2013 | Parthasarathy | ......... | G06F 21/53 726/1 |
| 2014/0075130 A1 * | 3/2014 | Bansal | .................. | G06F 3/0605 711/153 |
| 2016/0350094 A1 * | 12/2016 | Lee | ........................... | G06F 8/61 |
| 2017/0357453 A1 * | 12/2017 | Ko | ........................ | G06F 3/0608 |

FOREIGN PATENT DOCUMENTS

| | | |
|---|---|---|
| JP | 2001051839 A | 2/2001 |
| WO | 2016191177 A1 | 12/2016 |

OTHER PUBLICATIONS

European Search Report dated Sep. 13, 2019 for the corresponding EP Patent Application No. 19169858.8.

* cited by examiner

*Primary Examiner* — Viet D Vu
(74) *Attorney, Agent, or Firm* — Rankin, Hill & Clark LLP

(57) ABSTRACT

A service providing device includes a hardware processor that: accepts a providing request of one service; determines whether or not the one service can be provided by using any of a plurality of applications installed in an own device; and controls service processing, wherein in a case where it is determined that the one service can be provided, the hardware processor uses an application corresponding to the one service to start the service processing, and in a case where it is determined that the one service cannot be provided, the hardware processor transmits the providing request of the one service to an external server, so as to cause the external server to start the service processing, and downloads a specific application from the external server or another external device to install the specific application in the own device, takes over the service processing, and then executes the service processing.

23 Claims, 25 Drawing Sheets

| CONTAINER ID | SERVICE NAME | CPU (NUMBER OF CORES) | MEMORY (MB) | CLOUD URL | ON-PREMISE URL |
|---|---|---|---|---|---|
| container_01 | service_01 | 1 | 1000 | http://***.com/service_01 | http://192.168.0.1/service_01 |
| container_02 | service_02 | 2 | 1500 | http://***.com/service_02 | http://192.168.0.1/service_02 |
| container_03 | service_03 | 1 | 1000 | http://***.com/service_03 | http://192.168.0.1/service_03 |
| container_04 | service_04 | 1 | 1000 | http://***.com/service_04 | http://192.168.0.1/service_04 |

| SERVICE NAME | CLOUD URL |
|---|---|
| service_01 | http://***.com/service_01 |
| service_02 | http://***.com/service_02 |
| service_03 | http://***.com/service_03 |
| service_04 | http://***.com/service_04 |
| service_05 | http://***.com/service_05 |
| service_06 | http://***.com/service_06 |
| service_07 | http://***.com/service_07 |
| service_08 | http://***.com/service_08 |

| CONTAINER ID | SERVICE NAME | CPU (NUMBER OF CORES) | MEMORY (MB) | CLOUD URL | ON-PREMISE URL |
|---|---|---|---|---|---|
| container_01 | service_01 | 1 | 1000 | http://***.com/service_01 | http://192.168.0.1/service_01 |
| container_02 | service_02 | 2 | 1500 | http://***.com/service_02 | http://192.168.0.1/service_02 |
| container_03 | service_03 | 1 | 1000 | http://***.com/service_03 | http://192.168.0.1/service_03 |
| container_04 | service_04 | 1 | 1000 | http://***.com/service_04 | http://192.168.0.1/service_04 |
| container_05 | service_05 | 1 | 500 | http://***.com/service_05 | http://192.168.0.1/service_05 |

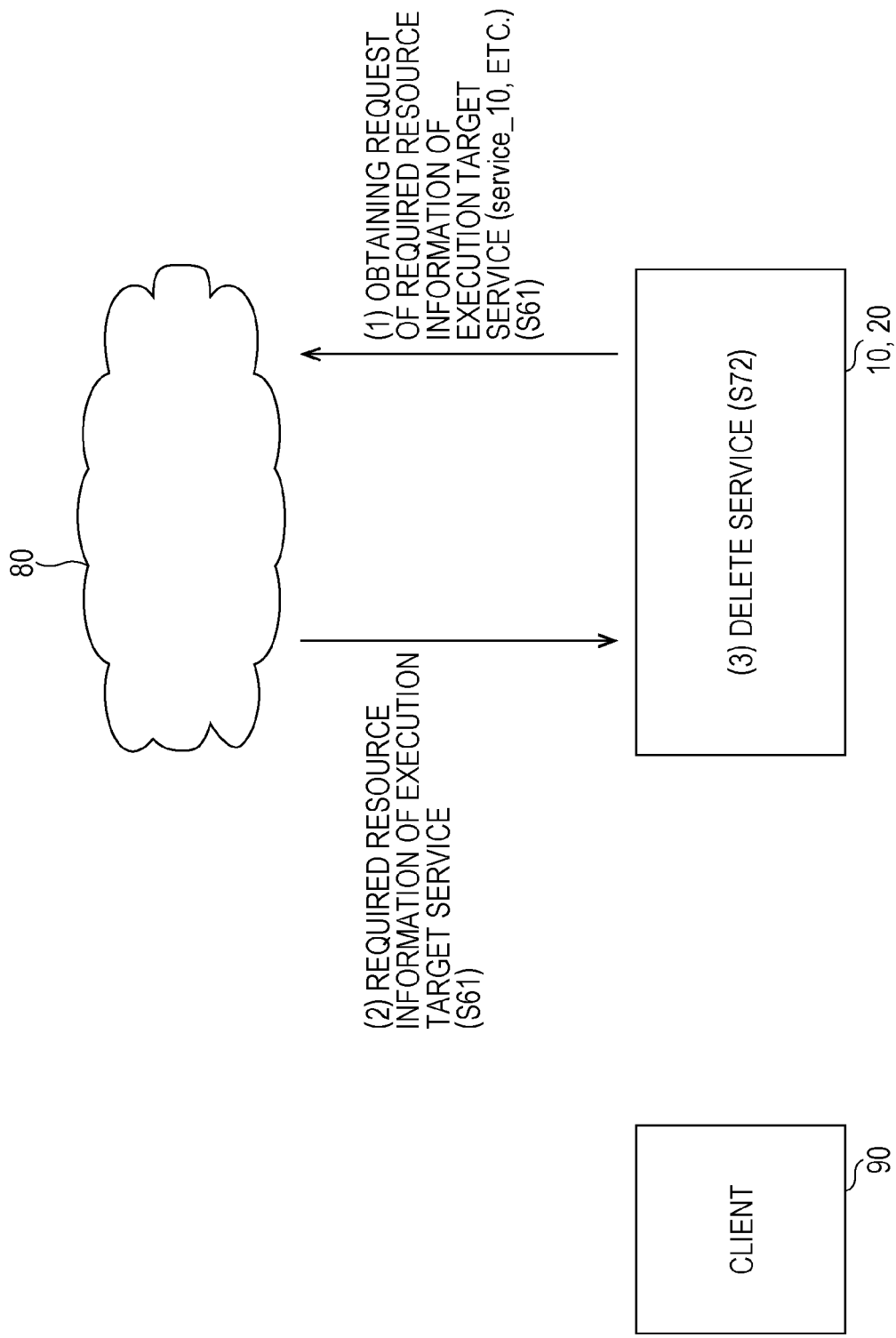

| CONTAINER ID | SERVICE NAME | CPU (NUMBER OF CORES) | MEMORY (MB) | CLOUD URL | ON-PREMISE URL | SERVER ID |
|---|---|---|---|---|---|---|
| container_01 | service_01 | 1 | 1000 | http://***.com/service_01 | http://192.168.0.1/service_01 | server_01 |
| container_02 | service_02 | 2 | 1500 | http://***.com/service_02 | http://192.168.0.1/service_02 | server_01 |
| container_03 | service_03 | 1 | 1000 | http://***.com/service_03 | http://192.168.0.1/service_03 | server_01 |
| container_04 | service_04 | 1 | 1000 | http://***.com/service_04 | http://192.168.0.1/service_04 | server_01 |
| container_05 | service_05 | 1 | 500 | http://***.com/service_05 | http://192.168.0.1/service_05 | server_01 |
| container_06 | service_06 | 3 | 2000 | http://***.com/service_06 | http://192.168.0.1/service_06 | server_02 |
| container_07 | service_07 | 2 | 1500 | http://***.com/service_07 | http://192.168.0.1/service_07 | server_02 |
| container_08 | service_08 | 2 | 1500 | http://***.com/service_08 | http://192.168.0.1/service_08 | server_02 |
| container_09 | service_09 | 1 | 1000 | http://***.com/service_09 | http://192.168.0.1/service_09 | server_01 |

| CONTAINER ID | SERVICE NAME | CPU (NUMBER OF CORES) | MEMORY (MB) | CLOUD URL | ON-PREMISE URL | SERVER ID |
|---|---|---|---|---|---|---|
| container_01 | service_01 | 1 | 1000 | http://***.com/service_01 | http://192.168.0.1/service_01 | server_01 |
| container_02 | service_02 | 2 | 1500 | http://***.com/service_02 | http://192.168.0.1/service_02 | server_01 |
| container_03 | service_03 | 1 | 1000 | http://***.com/service_03 | http://192.168.0.1/service_03 | server_01 |
| container_04 | service_04 | 1 | 1000 | http://***.com/service_04 | http://192.168.0.1/service_04 | server_01 |
| container_05 | service_05 | 1 | 500 | http://***.com/service_05 | http://192.168.0.1/service_05 | server_01 |
| container_06 | service_06 | 3 | 2000 | http://***.com/service_06 | http://192.168.0.1/service_06 | server_02 |
| container_07 | service_07 | 2 | 1500 | http://***.com/service_07 | http://192.168.0.1/service_07 | server_02 |
| container_08 | service_08 | 2 | 1500 | http://***.com/service_08 | http://192.168.0.1/service_08 | server_02 |
| container_09 | service_09 | 1 | 1000 | http://***.com/service_09 | http://192.168.0.1/service_09 | server_01 |

| CONTAINER ID | SERVICE NAME | CPU (NUMBER OF CORES) | MEMORY (MB) | CLOUD URL | ON-PREMISE URL | SERVER ID |
|---|---|---|---|---|---|---|
| container_01 | service_01 | 1 | 1000 | http://***.com/service_01 | http://192.168.0.1/service_01 | server_01 |
| — | service_02 | 2 | 1500 | http://***.com/service_02 | http://192.168.0.1/service_02 | — |
| container_03 | service_03 | 1 | 1000 | http://***.com/service_03 | http://192.168.0.1/service_03 | server_01 |
| container_04 | service_04 | 1 | 1000 | http://***.com/service_04 | http://192.168.0.1/service_04 | server_01 |
| container_05 | service_05 | 1 | 500 | http://***.com/service_05 | http://192.168.0.1/service_05 | server_01 |
| container_06 | service_06 | 3 | 2000 | http://***.com/service_06 | http://192.168.0.1/service_06 | server_02 |
| container_07 | service_07 | 2 | 1500 | http://***.com/service_07 | http://192.168.0.1/service_07 | server_02 |
| container_08 | service_08 | 2 | 1500 | http://***.com/service_08 | http://192.168.0.1/service_08 | server_02 |
| container_09 | service_09 | 1 | 1000 | http://***.com/service_09 | http://192.168.0.1/service_09 | server_01 |
| container_10 | service_10 | 2 | 1000 | http://***.com/service_10 | http://192.168.0.1/service_10 | server_01 |

FIG. 25

| SERVER ID | CPU (NUMBER OF CORES) | MEMORY (MB) | STORAGE (TB) |
|---|---|---|---|
| server_01 | 8 | 16000 | 6 |
| server_02 | 8 | 16000 | 6 |

SERVICE PROVIDING DEVICE AND PROGRAM THAT ARE CAPABLE OR PROVIDING A RELATIVELY LARGE NUMBER OF SERVICES

The entire disclosure of Japanese patent Application No. 2018-081350, filed on Apr. 20, 2018, is incorporated herein by reference in its entirety.

BACKGROUND

Technological Field

The present invention relates to a service providing device, and technology related thereto.

Description of the Related Art

A cloud server that provides a web service according to a request from a client terminal exists.

However, although depending on a communication environment, the communication speed of communication between a client terminal (an internal device of a LAN) and a cloud server (an external device of the LAN) is lower (low speed) than the communication speed in a local environment (the communication speed of communication between devices in the LAN). Therefore, there exists a problem that a reaction velocity or the like at the time of service provision decreases.

To cope with this problem, there exists a technology (refer to JP 2001-51839 A and the like) in which a program for a web service is downloaded to a server (for example, a proxy server on the local side) provided in a LAN, and the server (also referred to as a "service providing device") in the LAN is caused to operate the program. This enables providing of a service with relatively high-speed communication between the client terminal and the service providing device in the LAN.

However, since resources of the service providing device (the server or the like in the LAN) are limited, it is difficult for such a technology to always continue operating all of a large number of services in the service providing device.

SUMMARY

Accordingly, an object of the present invention relates to providing a service providing device that is capable of providing a relatively large number of services.

To achieve the abovementioned object, according to an aspect of the present invention, a service providing device reflecting one aspect of the present invention comprises a hardware processor that: accepts a providing request of one service; determines whether or not the one service can be provided by using any of a plurality of applications installed in an own device; and controls service processing corresponding to the providing request of the one service, wherein in a case where it is determined that the one service can be provided by using any of the plurality of applications, the hardware processor uses, among the plurality of applications, an application corresponding to the one service to start the service processing corresponding to the providing request of the one service, and in a case where it is determined that the one service cannot be provided even by using any of the plurality of applications, the hardware processor transmits the providing request of the one service to an external server that is another service providing device different from the service providing device, so as to cause the external server to start the service processing corresponding to the providing request, and downloads a specific application for providing the one service from the external server or another external device to install the specific application in the own device, after the installation of the specific application to the own device is completed, takes over, from the external server, the service processing that has been started by the external server resulting from the transmission of the providing request of the one service, and then executes the service processing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 12 is a drawing illustrating a list (service list) of services that are being executed in a server device;

FIG. 13 is a drawing illustrating a URL list;

FIG. 15 is a drawing illustrating a list of services that are being executed in a server device;

FIG. 20 is a conceptual diagram illustrating, for example, obtaining operation of required resource information of an execution target service;

FIG. 21 is a drawing illustrating a list of services that are being executed in a server device;

FIG. 22 is a drawing illustrating a list of services that are being executed in a server device;

FIG. 24 is a drawing illustrating a service list after replacement processing; and FIG. 25 is a drawing illustrating hardware resources of a server device.

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment

<1-1. Configuration Outline>

Figure 1:
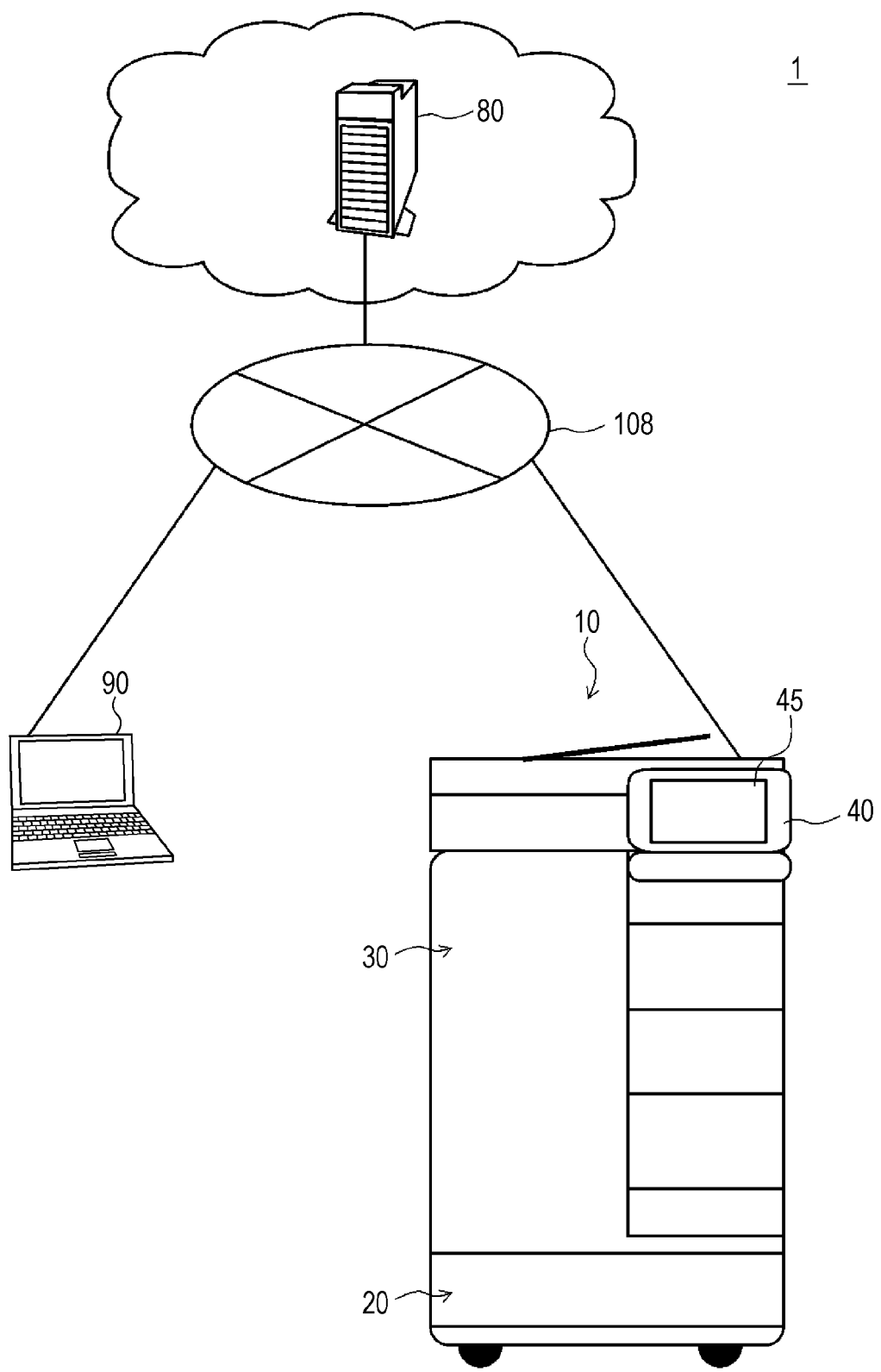
FIG. 1 is a drawing illustrating a service providing system.

FIG. 1 is a drawing illustrating a service providing system 1. The service providing system 1 is provided with a multi-functional peripheral (MFP) 10, a cloud server 80, and a client 90. It should be noted that the MFP 10 is also referred to as an "image forming apparatus" or the like.

The MFP 10, the cloud server 80 and the client 90 are connected through a network 108, and data can be mutually transmitted and received among the MFP 10, the cloud server 80 and the client 90. It should be noted that the network 108 includes various networks such as a local area network (LAN), and the Internet. Here, the MFP 10 and the client 90 are arranged in the same LAN. In addition, the cloud server 80 is arranged outside the LAN. The client 90 and the MFP 10 are each capable of accessing the cloud server 80 through the Internet.

Figure 2:
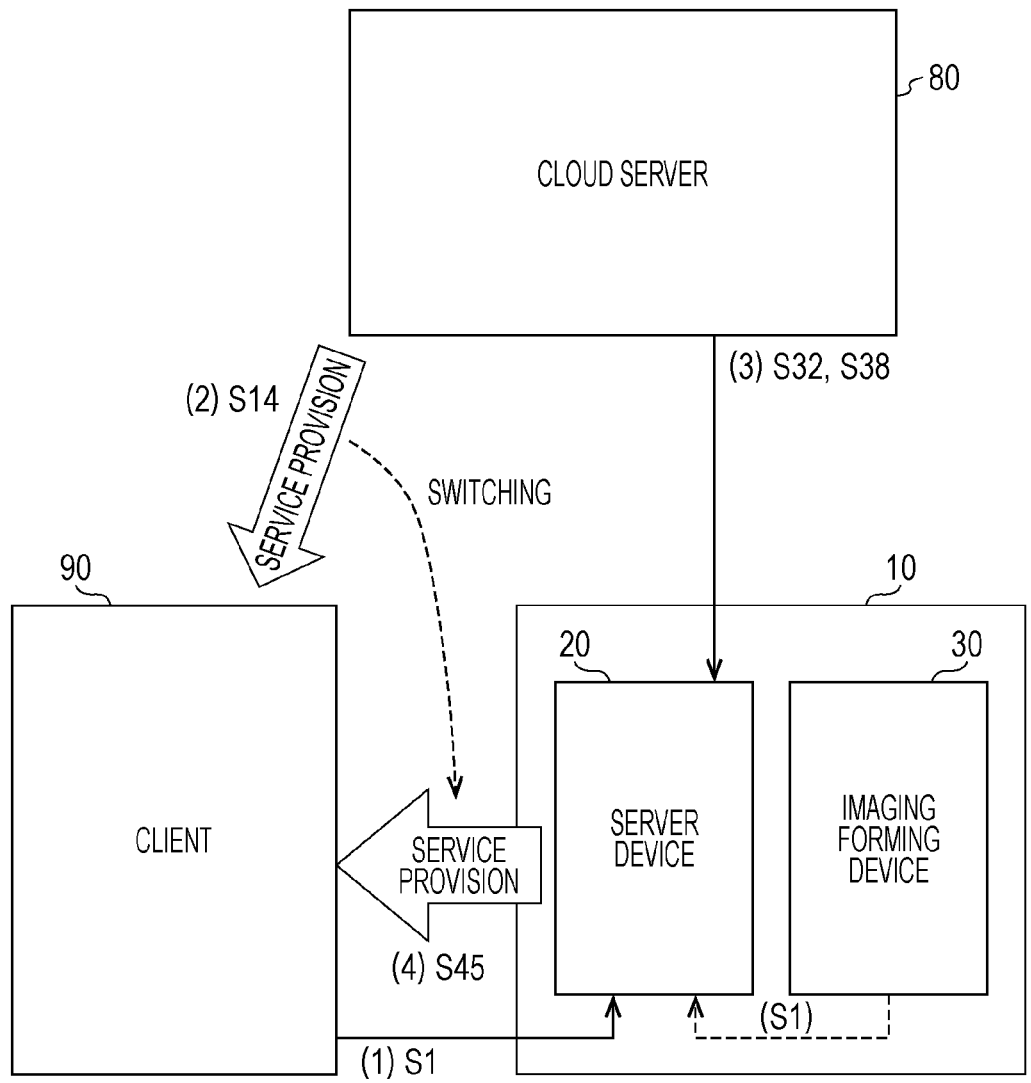
FIG. 2 is a conceptual diagram illustrating operation in the service providing system.

This AFP 10 is provided with a plurality of devices that operate independently of each other (here, two devices of the server device 20 and the imaging forming device 30) (also refer to FIG. 2). Here, the server device 20 and the imaging forming device 30 are housed in one housing, and are integrally formed. Incidentally, it is assumed that the one housing includes a predetermined member, and a member that is provided so as to be openable and closable with respect to the predetermined member (for example, an original document cover with an auto document feeder (ADF), etc., the original document cover being pivotably provided with respect to a rotating shaft provided in an original document table of the MFP 10). In addition, this AFP 10 is also provided with a manipulation display part 40 (also refer to FIG. 1). The manipulation display part 40 is shared by the plurality of devices 20, 30.

A device (the AFP 10 (in detail, the server device 20)) on the on-premise side enables the client 90 to receive a service, and a device (the cloud server 80) on the cloud side also enables the client 90 to receive a service (also refer to FIG. 2). The client 90 is configured as, for example, a personal computer or the like.

<1-2. Configuration of Imaging Forming Device 30>

The imaging forming device 30 (also refer to FIG. 1) is a device that is capable of executing various jobs (a copy job, a scan job, etc.). It should be noted that the imaging forming device 30 is also referred to as an "MFP device".

Figure 3:
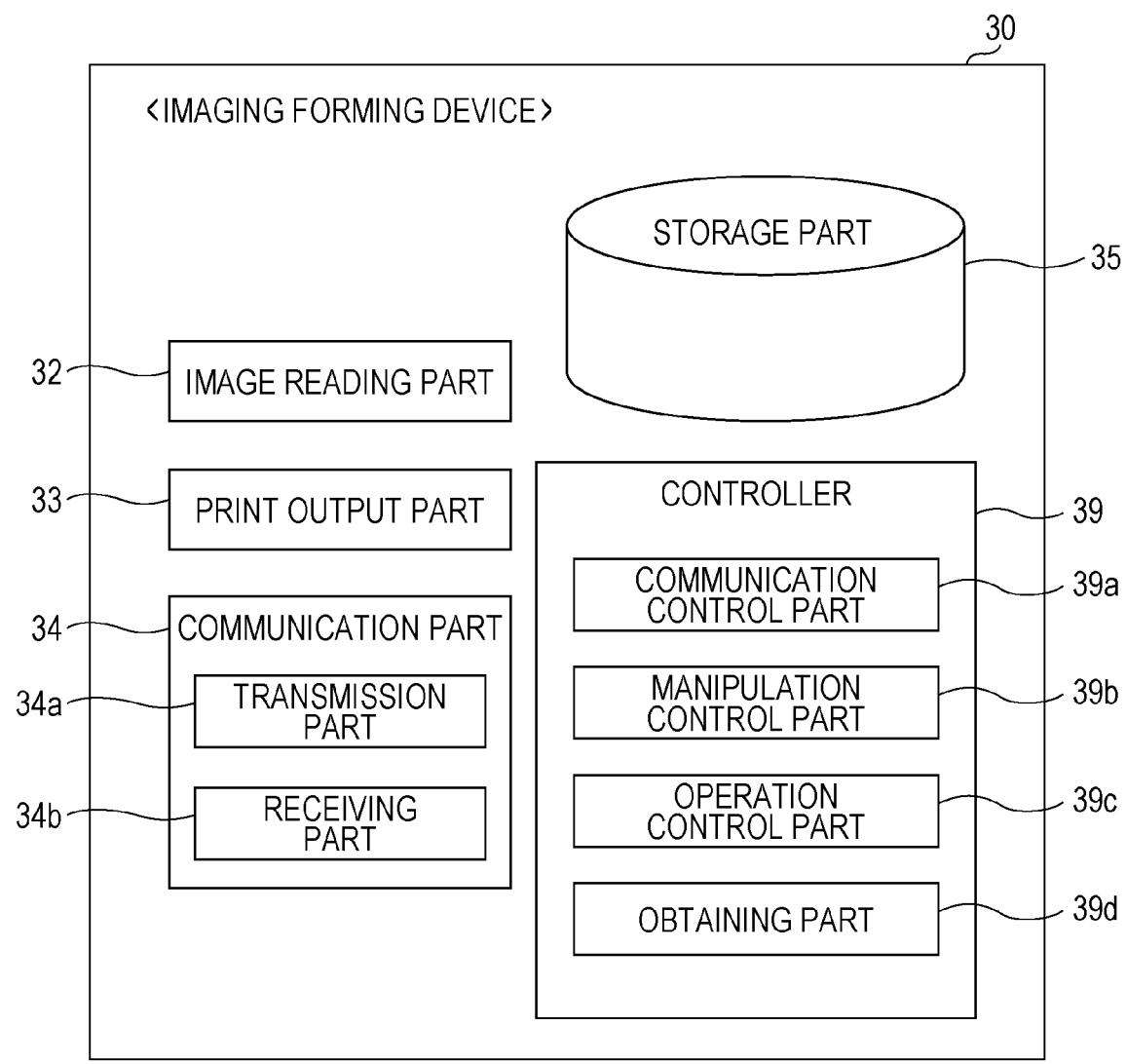
FIG. 3 is a diagram illustrating functional blocks of an imaging forming device.

FIG. 3 is a diagram illustrating functional blocks of the imaging forming device 30. The imaging forming device 30 includes an image forming function (a copy function, a scanning function, a facsimile function, a box print function, etc.). Specifically, as shown in FIG. 3, the imaging forming device 30 is provided with an image reading part 32, a print output part 33, a communication part 34, a storage part 35, a controller (control part) 39 and the like. The imaging forming device 30 realizes various functions by causing each of these parts to combinedly operate.

The image reading part 32 is a processing part that optically reads (that is to say, scans) an original document placed at a predetermined position (an auto document feeder (ADF), a glass surface or the like) of the imaging forming device 30, and generates image data of the original document (also referred to as an "original document image" or a "scanned image"). This image reading part 32 is also referred to as a "scanning part" or the like. The imaging forming device 30 is a device that is capable of reading an original document placed at a predetermined position, and is also referred to as an "image reading device".

The print output part 33 is an output part that prints out an image to various media such as paper on the basis of data related to a print target. The print output part 33 includes a printout mechanism (specifically, a toner unit (developing unit), a photoconductive drum unit, an intermediate transfer belt, a transfer part, a fixing part, a transport part and the like). The printout mechanism is also referred to as an "image forming mechanism". In addition, the imaging forming device 30 is a device that is capable of printing out an image to various media, and is also referred to as a "print output device".

The communication part 34 is a processing part that is capable of performing facsimile communication through a public line or the like. Moreover, the communication part 34 is also capable of performing network communication through a network. This network communication uses various protocols such as Transmission Control Protocol/Internet Protocol (TCP/IP). Using the network communication enables the imaging forming device 30 to give and receive various data to/from a desired destination (the server device 20, etc.).

The storage part 35 is formed by various storage devices (a (volatile and/or nonvolatile) semiconductor memory and/or a hard disk drive (HDD), etc.).

The controller 39 is a control device that is built into the imaging forming device 30, and controls the imaging forming device 30 in a unified manner. The controller 39 is configured as a computer system that is provided with a central processing unit (CPU) (also referred to as a "microprocessor" or a "computer processor"), various semiconductor memories (a RAM and a ROM) and the like. The controller 39 realizes various processing parts by executing, in the CPU, a predetermined software program (also merely referred to as a "program") stored in the ROM (for example, an EEPROM (registered trademark)). It should be noted that the program (in detail, a program module group) may be recorded on a portable recording medium such as a USB memory so as to be read from the recording medium and installed in the imaging forming device 30. Alternatively, the program may be downloaded via a network so as to be installed in the imaging forming device 30.

Specifically, as shown in FIG. 3, by executing the above-described program, the controller 39 realizes various processing parts including a communication control part 39a, a manipulation control part 39b, an operation control part 39c, and an obtaining part 39d.

The communication control part 39a is a processing part that controls communication operation with other devices (including other devices (the server device 20, etc.) in the same housing (the same apparatus), and devices provided in other housings of other apparatuses) in cooperation with the communication part 34 and the like.

The manipulation control part 39b is a processing part that controls input operation (operation of accepting manipulation input) for the manipulation display part 40 (in particular, a touch panel 45 (refer to FIG. 1)), and controls display operation (display output operation) in the manipulation display part 40 (in particular, the touch panel 45), in cooperation with the manipulation display part 40 (refer to FIG. 1). For example, the manipulation control part 39*b* causes the manipulation display part 40 (the touch panel 45) to display, for example, information related to an image forming function of the imaging forming device 30, and obtains, from the manipulation display part 40, manipulation input information (touch information, etc.) related to user's manipulation for the manipulation display part 40.

The operation control part 39*c* is a processing part that controls various operation (job operation, etc.) in the imaging forming device 30. The operation control part 39*c* controls print job operation, copy job operation, scan job operation and the like.

<1-3. Configuration of Server Device 20>

The server device 20 (also refer to FIG. 1) is a device that is capable of realizing a server function. The server device 20 is configured as, for example, a general-purpose computer device.

Figure 4:
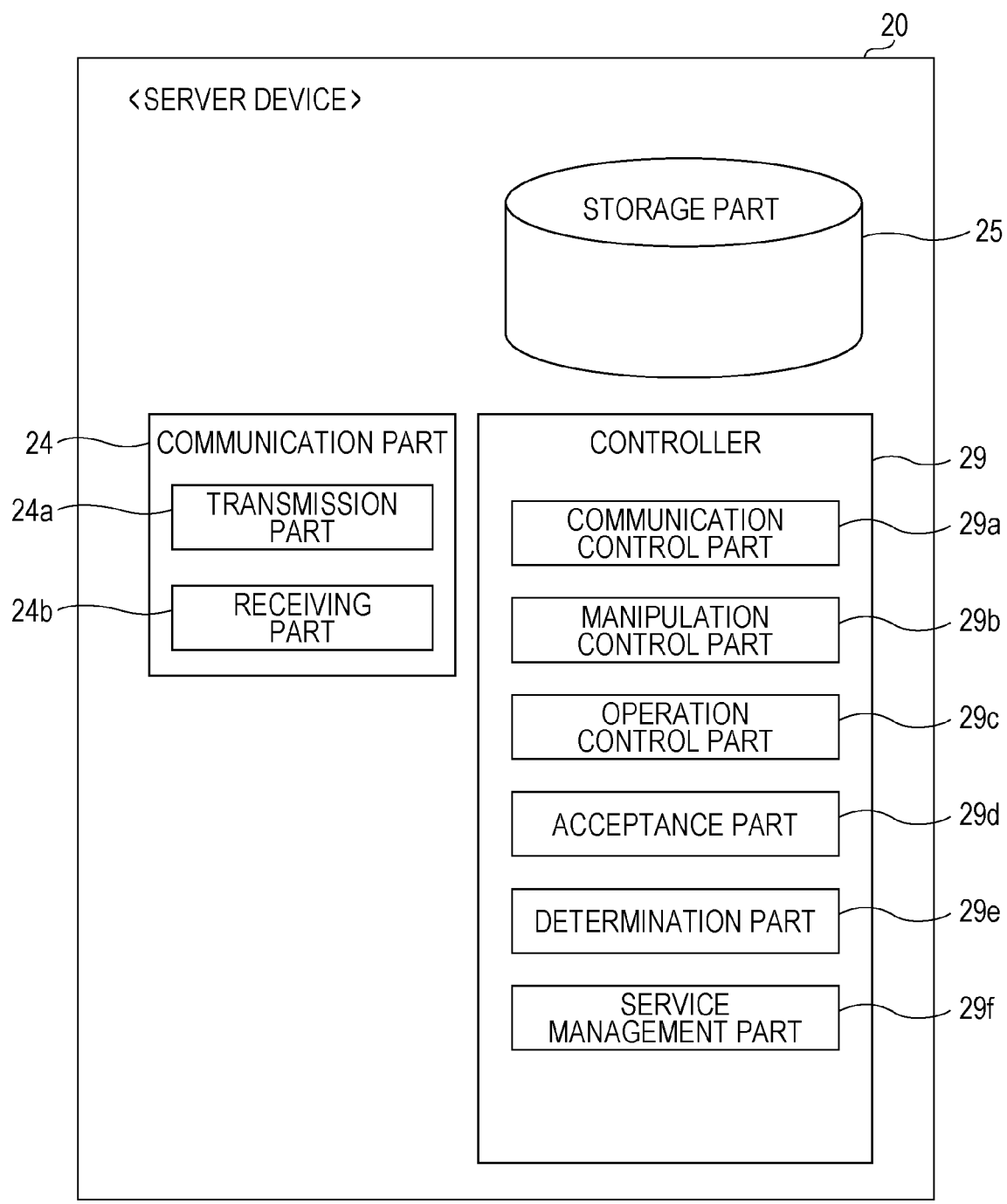
FIG. 4 is a diagram illustrating functional blocks of a server device.

FIG. 4 is a diagram illustrating functional blocks of the server device 20.

As shown in the functional block diagram of FIG. 4, the server device 20 is provided with a communication part 24, a storage part 25, a controller (control part) 29 and the like, and realizes various functions by causing each of these parts to combinedly operate.

The communication part 24 is capable of performing network communication. This network communication uses various protocols such as Transmission Control Protocol/Internet Protocol (TCP/IP). Using the network communication enables the server device 20 to give and receive various data in conjunction with desired destinations (the client 90, the cloud server 80, the imaging forming device 30 and the like).

The storage part 25 is formed by various storage devices (a (volatile and/or nonvolatile) semiconductor memory and/or a hard disk drive (HDD), etc.).

The controller (control part) 29 is a control device that is built into the server device 20, and controls the server device 20 in a unified manner. The controller 29 is configured as a computer system that is provided with a CPU, various semiconductor memories (an RAM and a ROM), and the like. The controller 29 realizes various processing parts by executing, in the CPU, a predetermined program stored in the storage part (the semiconductor memory, etc.). It should be noted that the program (in detail, a program module group) may be recorded on a portable recording medium such as a USB memory so as to be read from the recording medium and installed in the server device 20. Alternatively, the program may be downloaded via a network so as to be installed in the server device 20.

Specifically, by executing the program or the like, the controller 29 realizes various processing parts including a communication control part 29*a*, a manipulation control part 29*b*, an operation control part 29*c*, an acceptance part 29*d*, a determination part 29*e*, and a service management part 29*f*.

The communication control part 29*a* is a processing part that controls communication operation with other devices (including other devices (the image forming device 30, etc.) in the same housing (the same apparatus), and devices provided in other housings of other apparatuses) in cooperation with the communication part 24 and the like.

The manipulation control part 29*b* is a processing part that controls input operation for the manipulation display part 40 (in particular, the touch panel 45), and controls display operation in the manipulation display part 40 (in particular, the touch panel 45), in cooperation with the manipulation display part 40. For example, the manipulation control part 29*b* causes the manipulation display part 40 (the touch panel 45) to display information related to the server device 20, and obtains, from the manipulation display part 40, manipulation input information related to user's manipulation for the manipulation display part 40 (the touch panel 45).

The operation control part 29*c* is a processing part that controls various operation (server operation, etc.) in the server device 20.

The acceptance part 29*d* is a processing part that accepts a providing request to provide each service from each client (a terminal, etc.).

The determination part 29*e* is a processing part that determines whether or not one service, the providing request of which has been accepted by the acceptance part 29*d*, can be provided by using any of a plurality of applications that have already been installed in an own device. In other words, the determination part 29*e* determines whether or not the one service can be immediately provided. For example, in a case where the specific application is already installed in the own device (and is being executed), the determination part 29*e* determines that the one service can be immediately provided.

The service management part 29*f* is a processing part that controls service processing corresponding to a providing request of each service.

As various services, a "translation service", an "OCR service", a "color control service" and the like are presented. The "translation service" is a service that translates a document in a translation target file from a current language to a different language, and then outputs the document. In addition, the "OCR service" is a service that converts a character string in a processing target file (image data file) into text data by OCR processing. Moreover, the "color control service" is a service that performs fine adjustment of an output color or an input color in the imaging forming device 30.

A plurality of virtual environments is built in the server device 20. The plurality of virtual environments are built (by being logically sectioned), and the hardware (the processor and the HDD) of the server device 20 is shared among the virtual environments.

Figure 16:
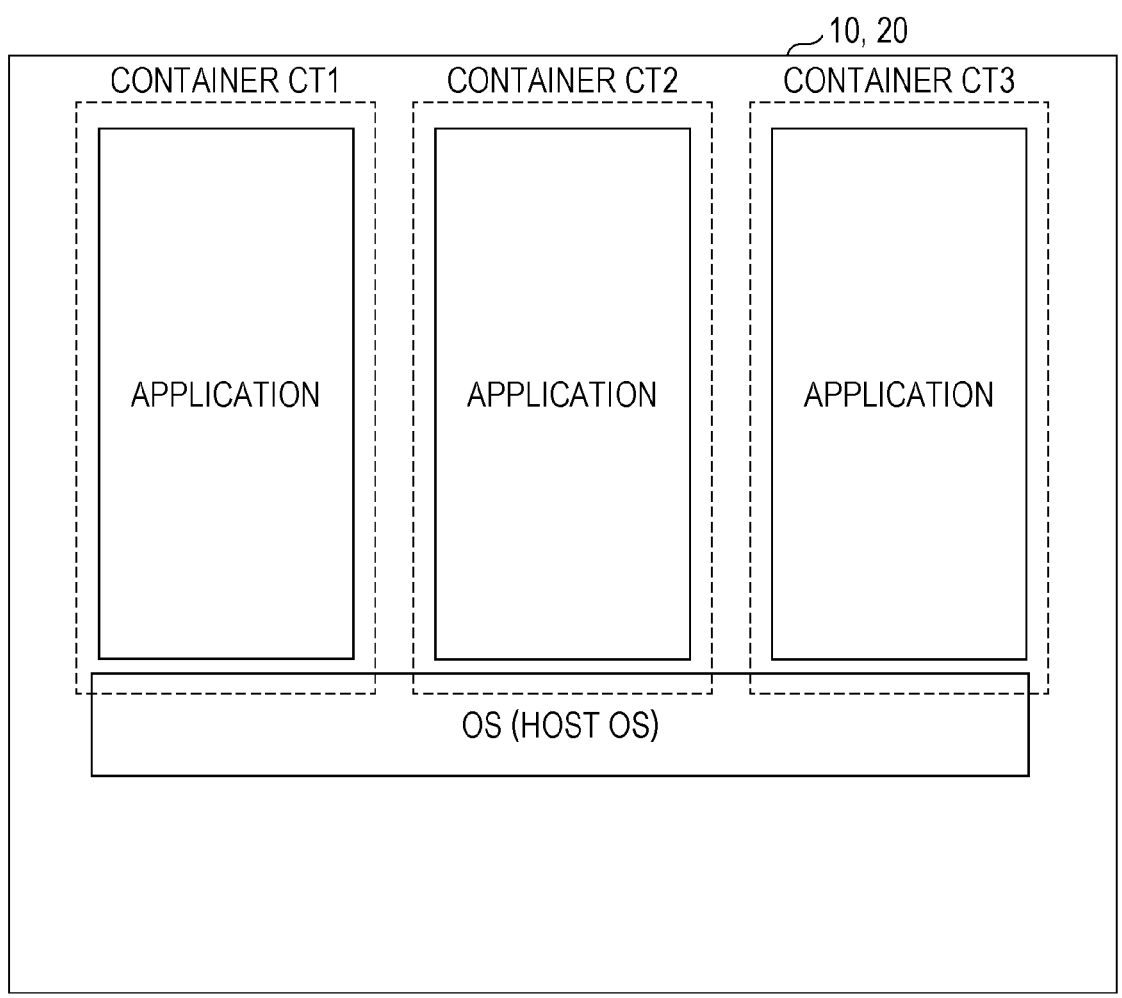
FIG. 16 is a drawing illustrating a plurality of virtual container environments.

For example, a "virtual container environment" is presented as the "virtual environment" (refer to FIG. 16). A plurality of virtual container environments is formed by virtual containers (also merely referred to as "containers") CT (CT1, CT2, . . . ) that operate on a plurality of guest OSs on the same host OS, respectively. Incidentally, FIG. 16 is a drawing illustrating a plurality of virtual container environments.

In addition, an application for providing a certain service (in detail, a server application) can be executed in each virtual environment. For example, an application for providing a service "service_01" can be executed in a container CT1 ("container_01"). In other words, the service "service_01" can be provided by the container CT1. Similarly, another service ("service_02", etc.) can be provided by a container CT2, and still another service ("service_03", etc.) can be provided by a container CT3. The same applies to a container CT4 (not illustrated) and subsequent ones.

This MFP 10 (in particular, the server device 20) operates as a service providing device. In addition, the cloud server 80 (a server outside the MFP 10 (also merely referred to as an "external server")) also operates as a service providing device that differs from the MFP 10. A large number of applications for providing a large number of services are installed in the cloud server 80. Meanwhile, only a part of the large number of applications is installed in the MFP 10 (at a certain point of time).

In addition, the MFP 10 (which includes the server device 20) is a server device that is arranged in the same LAN as that of the client 90. The server device (MFP 10) is a server that is possessed by an own company, and is operated by the own company. Therefore, the server device is also referred to as an "on-premise server". The MFP 10 is capable of providing various services according to a service request from the client 90. Each service can also be provided by the cloud server 80. However, since the MFP 10 and the client 90 exist in the same LAN, the communication speed of communication between the MFP 10 (in particular, the server device 20) and the client 90 is higher than the communication speed of communication between the cloud server 80 and the client 90. Therefore, the reaction velocity at the time of service provision by the MFP 10 is higher than the reaction velocity at the time of service provision by the cloud server 80. In addition, the on-premise server 10 is capable of not only accepting a service providing request from the external client 90, but also accepting a service providing request from the internal client (the imaging forming device 30). In other words, the imaging forming device 30 inside the MFP 10 functions as a client with respect to the MFP 10 (in detail, the server device 20).

<1-4. Operation>

Figure 5:
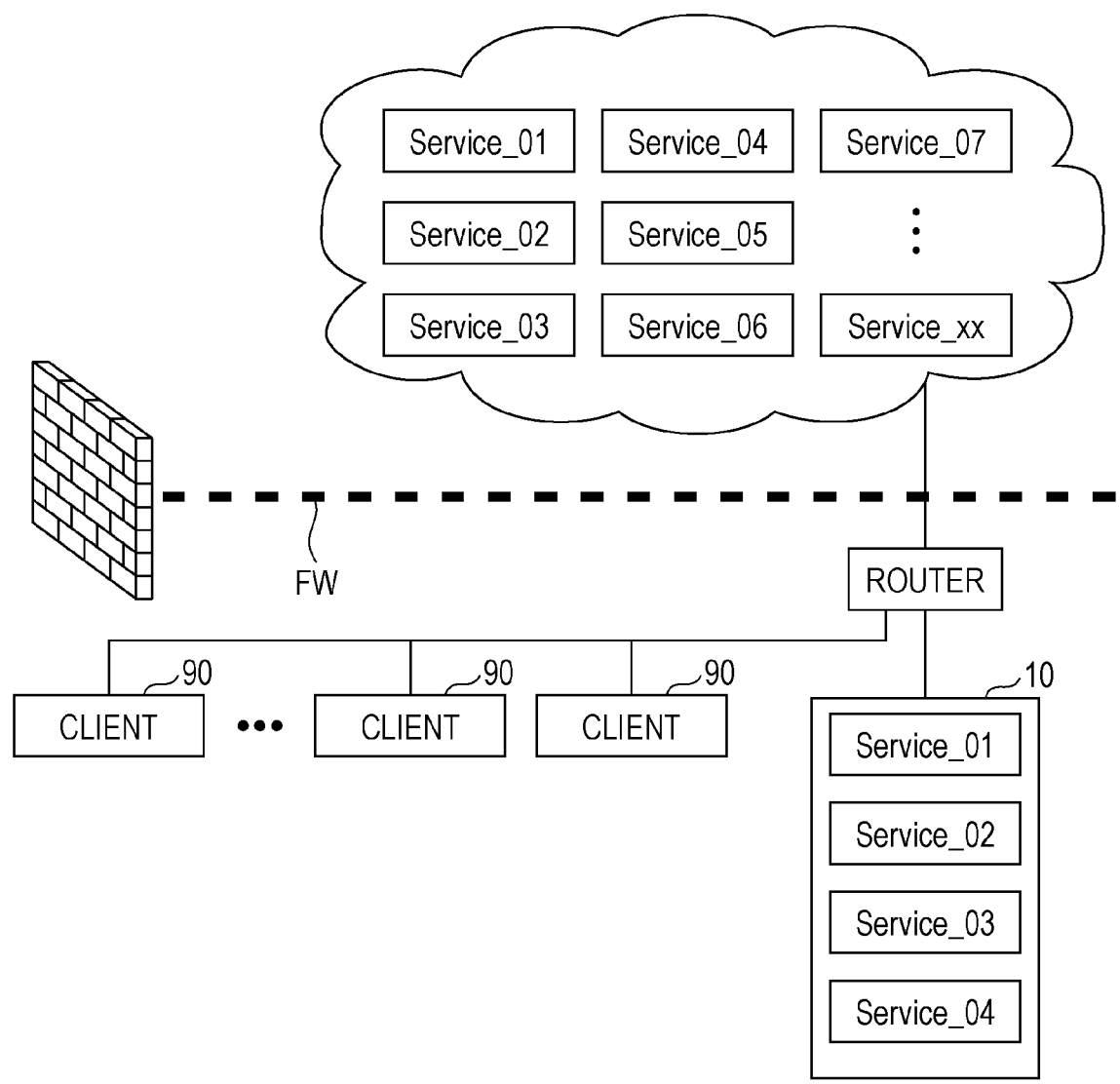
FIG. 5 is a drawing illustrating an execution state of services in an MFP and a cloud server.

FIG. 5 is a drawing illustrating an execution status of services in the MFP 10 and the cloud server 80. As shown in FIG. 5, at a certain point of time, various services (for example, 80 services ("service_01" to "service_80")) are being executed in the cloud server 80, and a part (here, four services ("service_01" to "service_04")) of the services are also installed in the MFP 10 beforehand, and being executed (refer to FIG. 12). In other words, in the MFP 10, four applications corresponding to the four services respectively have already been installed. Incidentally, FIG. 12 is a drawing illustrating a list (a service list 250) of services that are currently being executed in the MFP 10 (the server device 20). The service list 250 is stored in the storage part 25 (FIG. 4) of the server device 20.

Figure 6:
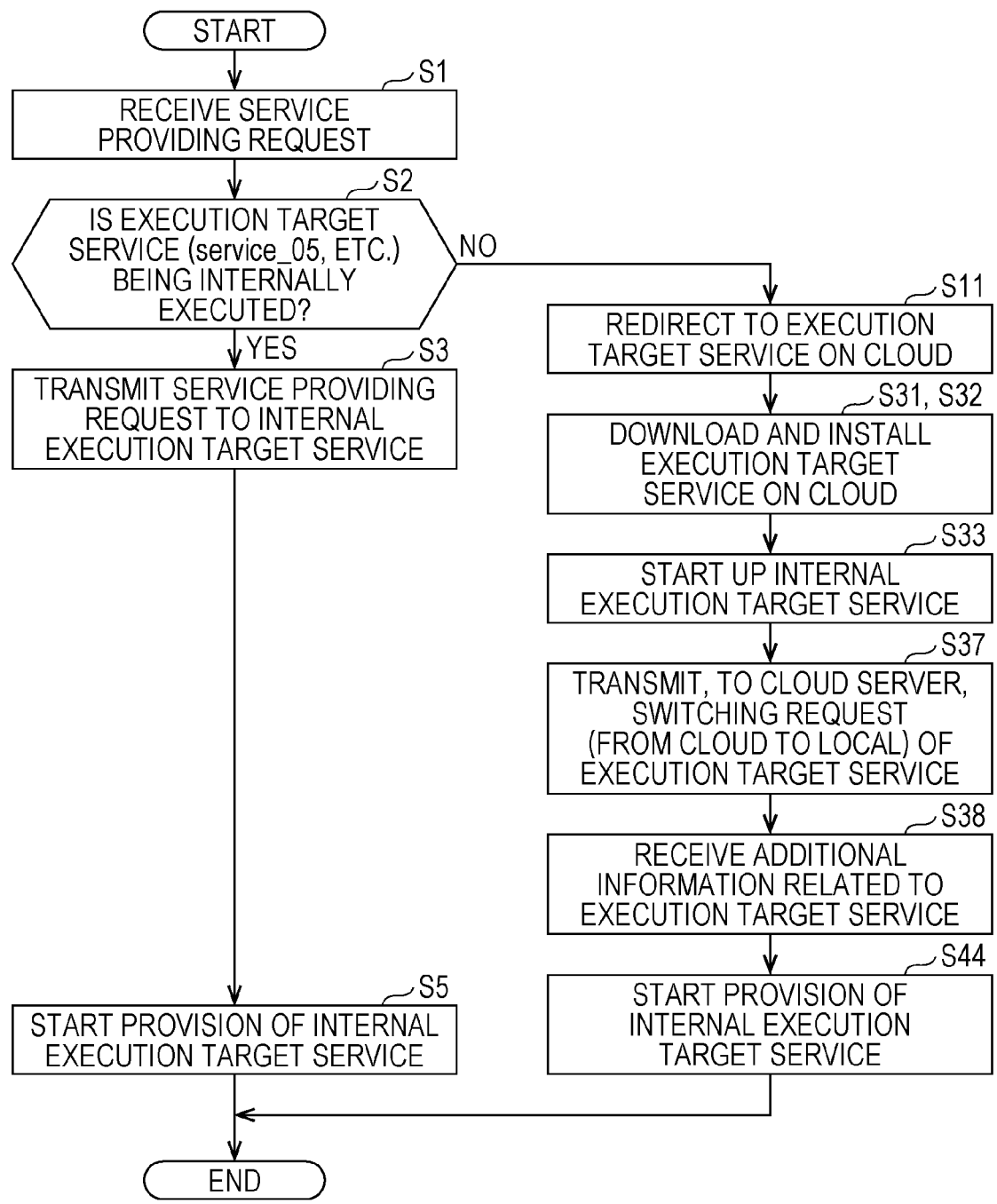
FIG. 6 is a flowchart illustrating operation of a service providing device according to a first embodiment.

FIG. 6 is a flowchart illustrating operation of the MFP 10 (in detail, the server device 20) according to the first embodiment.

In a step S1, the server device 20 accepts, from the client 90 or the like in the same LAN, a providing request (also referred to as a "service providing request") to provide a desired service of a user. In the providing request, a service to be executed (an execution target service) is specified.

In the next step S2, a determination is made as to whether or not the execution target service can be provided by using any of a plurality of applications that have already been installed in the server device 20 (at this point of time) (also referred to as "installed applications"). In other words, a determination is made as to whether or not the execution target service corresponds to any of the plurality of services (here, four services ("service_01" to "service_04")) corresponding to the installed applications. Specifically, whether or not services that are currently being executed include the execution target service is determined on the basis of the service list 250, and according to a result of the determination, a determination is made as to whether or not the execution target service can be provided by using any of the plurality of applications.

Figure 7:
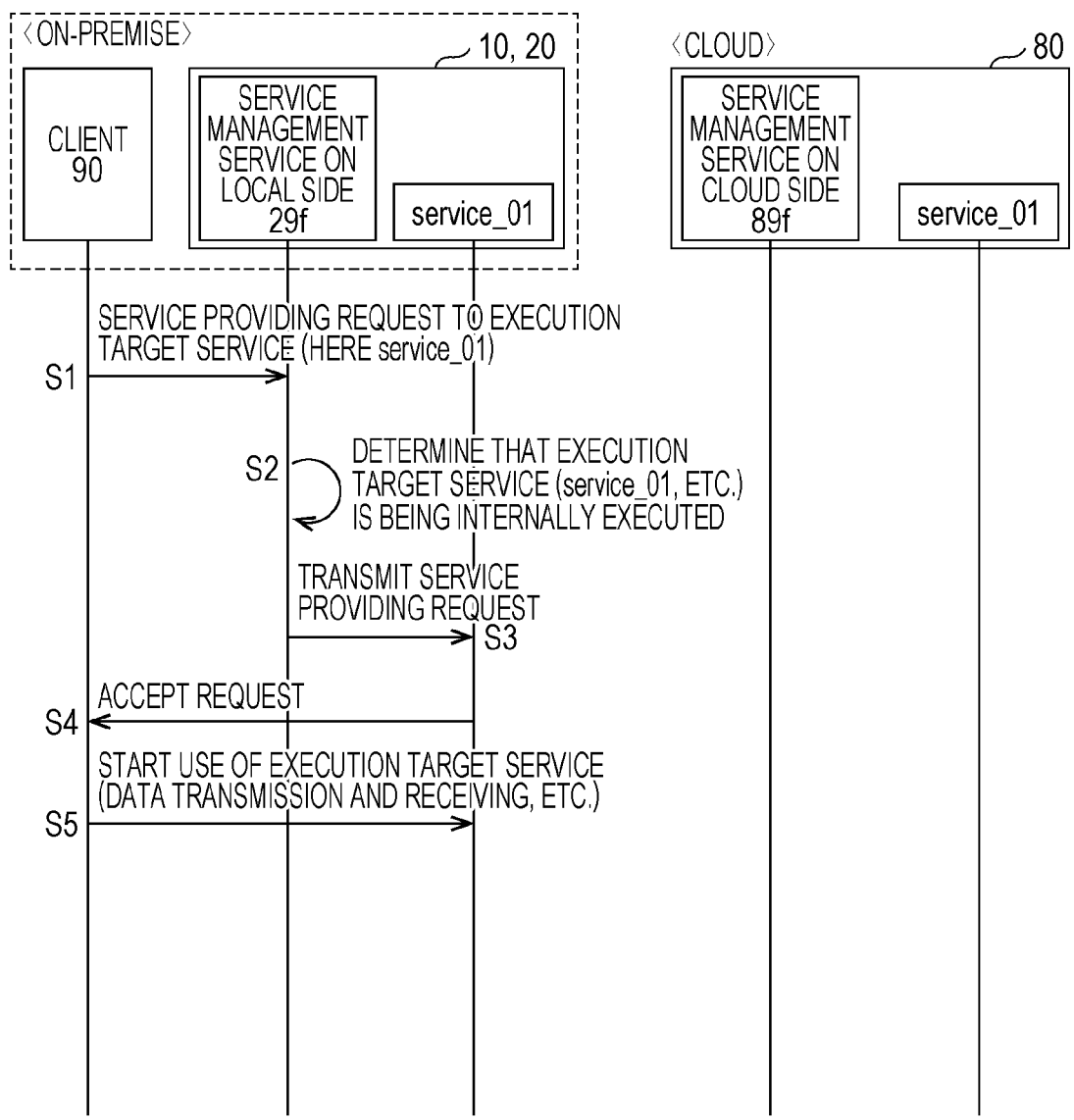
FIG. 7 is a timing chart illustrating operation (in detail, operation performed in a case where an execution target service "can be" immediately provided) of the present system.

In a case where it is determined that the execution target service can be provided by using any of the plurality of applications, the server device 20 uses an application corresponding to the execution target service, among the plurality of applications, to start service processing corresponding to the providing request to provide the execution target service (refer to FIG. 7). In other words, the server device 20 provides the client 90 with the execution target service by using an application that has already been installed in the own device 20. In other words, the server device 20 uses the own device to immediately start provision of the execution target service. Incidentally, FIG. 7 is a timing chart illustrating operation of the present system 1 (in detail, operation performed in a case where the execution target service can be provided by using any of the plurality of applications).

For example, in a case where the execution target service "service_01" is specified, it is determined, on the basis of a state in which the service "service_01" is included in the service list 250 (FIG. 12), that the execution target service can be provided by using any (in detail, the installed application for the service "service_01") of the plurality of applications that have already been installed. In this case, as shown in FIG. 7, the service management part 29*f* of the server device 20 transmits the service providing request to the execution target service "service_01" (step S3), and the client 90 is notified of an acceptance of the service providing request (step S4). Subsequently, the client 90 is provided with the execution target service from the MFP 10 (in detail, the service "service_01" in the server device 20) (step S5).

It should be noted that although the execution target service is already being executed in the above-described embodiment, the present invention is not limited to this. For example, in a case where an execution target service ("service_01", etc.) has already been installed, but is not yet executed, processing of steps S3, S4, S5 may be executed after startup processing of the execution target service is immediately performed.

Meanwhile, in a case where the execution target service "service_05" is specified, it is determined, in the step S2, that the service "service_05" is not included in the service list 250 (FIG. 12). Subsequently, on the basis of a result of the determination, it is determined that it is "impossible" to "provide the execution target service by using any of the plurality of applications that have already been installed in the server device 20". In other words, it is determined that it is impossible to provide the execution target service even by using any of the plurality of applications.

Figure 8:
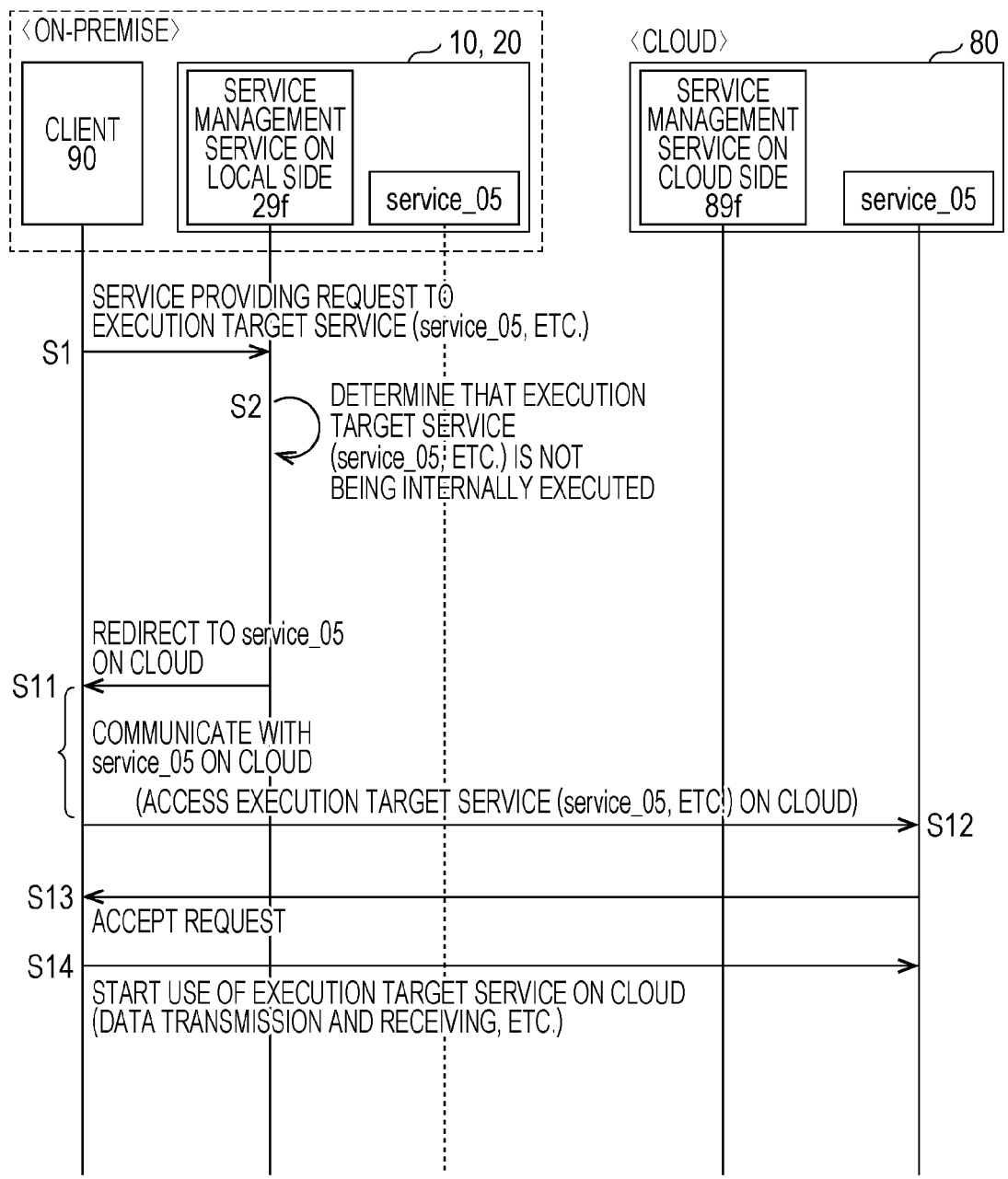
FIG. 8 is a timing chart illustrating operation (in detail, operation performed in a case where an execution target service "cannot be" immediately provided) of the present system.
Figure 9:
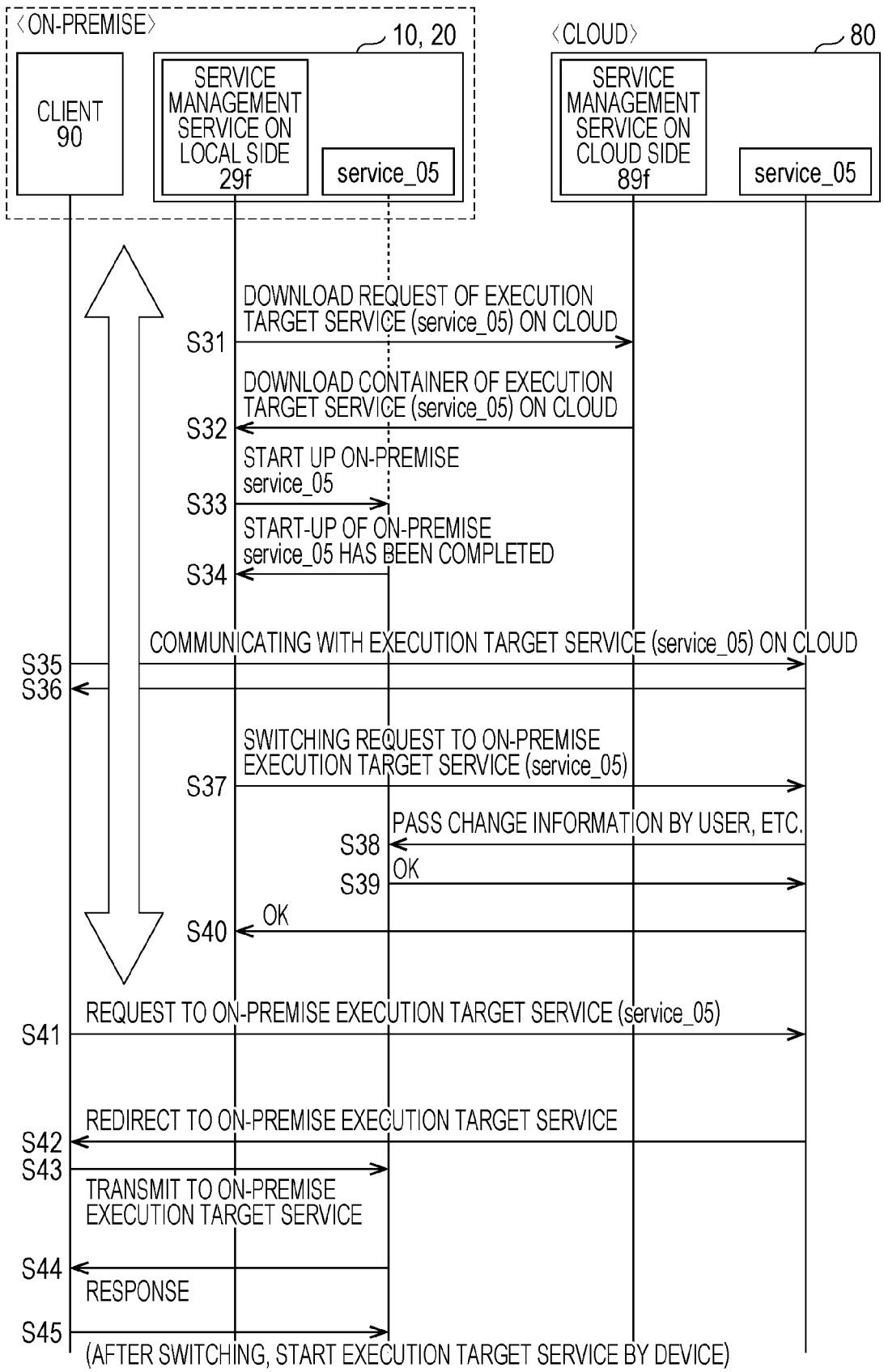
FIG. 9 is a drawing illustrating operation subsequent to FIG. 8.
Figure 10:
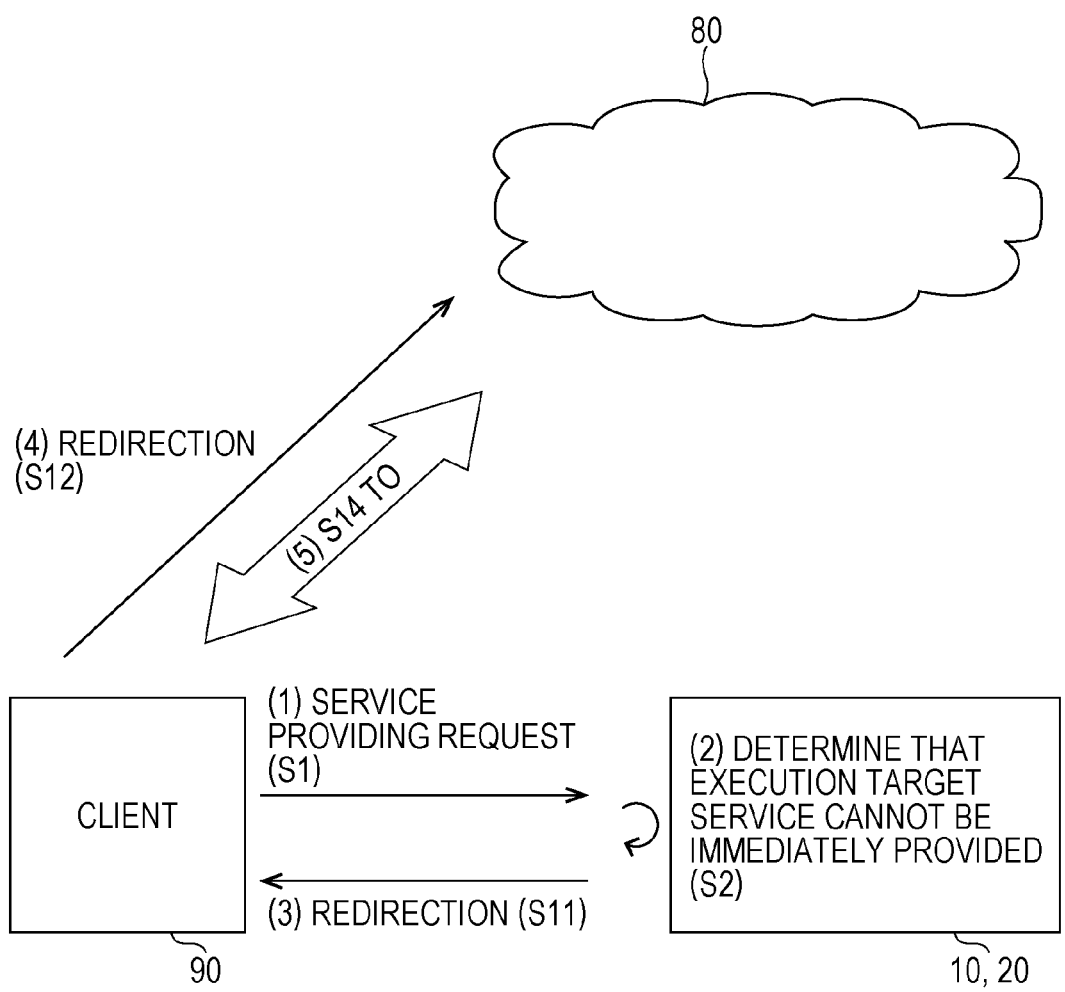
FIG. 10 is a conceptual diagram illustrating operation of FIG. 8.
Figure 11:
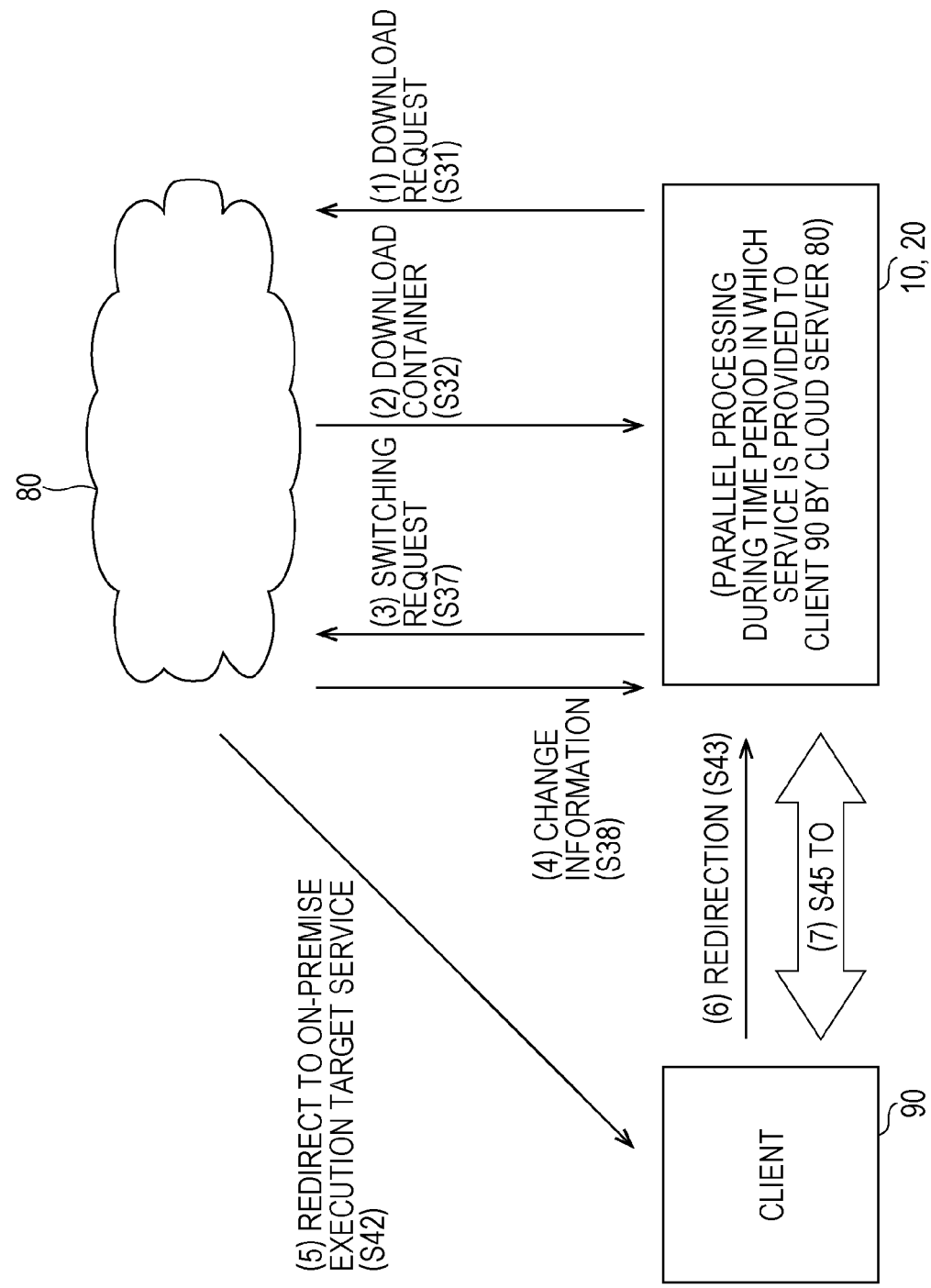
FIG. 11 is a conceptual diagram illustrating operation of FIG. 9.

In this case, the server device 20 executes a step S11 (FIG. 6) and subsequent ones (refer to FIG. 8 to FIG. 11). Incidentally, FIGS. 8 and 9 are timing charts each illustrating operation of the present system 1 (in detail, operation performed in a case where the execution target service cannot be provided by using any of the plurality of applications). In addition, FIG. 10 is a conceptual diagram illustrating operation of FIG. 8, and FIG. 11 is a conceptual diagram illustrating operation of FIG. 9. The description below focuses on a situation in which the service "service_05" is specified as an execution target service in the step S1.

Specifically, first of all, in the steps S11 to S14 (refer to FIGS. 8 and 10), the service management part 29*f* of the server device 20 transmits a providing request of an execution target service to the cloud server 80, thereby causing the cloud server 80 to start service processing corresponding to the providing request. In other words, the server device 20 causes the cloud server 80 to provide the execution target service for the client 90.

In detail, in the step S11, the server device 20 redirects the service providing request to a service on the cloud server 80.

Specifically, first of all, the server device 20 makes an inquiry to the cloud server 80 about a URL for accessing the execution target service on the cloud server 80, and obtains, from the cloud server 80, the URL for making an access thereto. It should be noted that the present invention is not limited to this, and the server device 20 may obtain the URL for accessing the execution target service on a cloud by using a URL list 210 (FIG. 13) stored in the storage part 25. The URL list 210 is a data list that lists and stores URLs for accessing execution target services on the cloud beforehand.

In this manner, for example, a URL ("http://***.com/service_05") for accessing the service "service_05" provided on the cloud server 80 is obtained. In addition, when the URL is obtained, redirection processing of redirecting to the URL is performed (step S11).

This redirection processing (step S11) causes the access to the original URL "http://192.168.0.1/service_05" to change to an access to a new URL "http://***.com/service_05", and the client 90 accesses (not the MFP 10 (the server device 20) but) the cloud server 80 (step S12). In other words, the service providing request from the client 90 is transferred to the cloud server 80. When the cloud server 80 receives the service providing request, the cloud server 80 transmits an acceptance of the service providing request to the client 90 (step S13). Subsequently, provision of the execution target service by the cloud server 80 is started (step S14). In other words, the client 90 can be provided with the execution target service from the cloud server 80.

Moreover, the MFP 10 (server device 20) executes, for example, downloading of a specific application for providing the execution target service during a time period in which the execution target service is provided by the cloud server 80 (refer to steps S31 to S34) (refer to FIGS. 9 and 11). In other words, in parallel to the provision of the execution target service from the cloud server 80 to the client 90, the server device 20 executes, for example, downloading from the cloud server 80.

Figure 14:
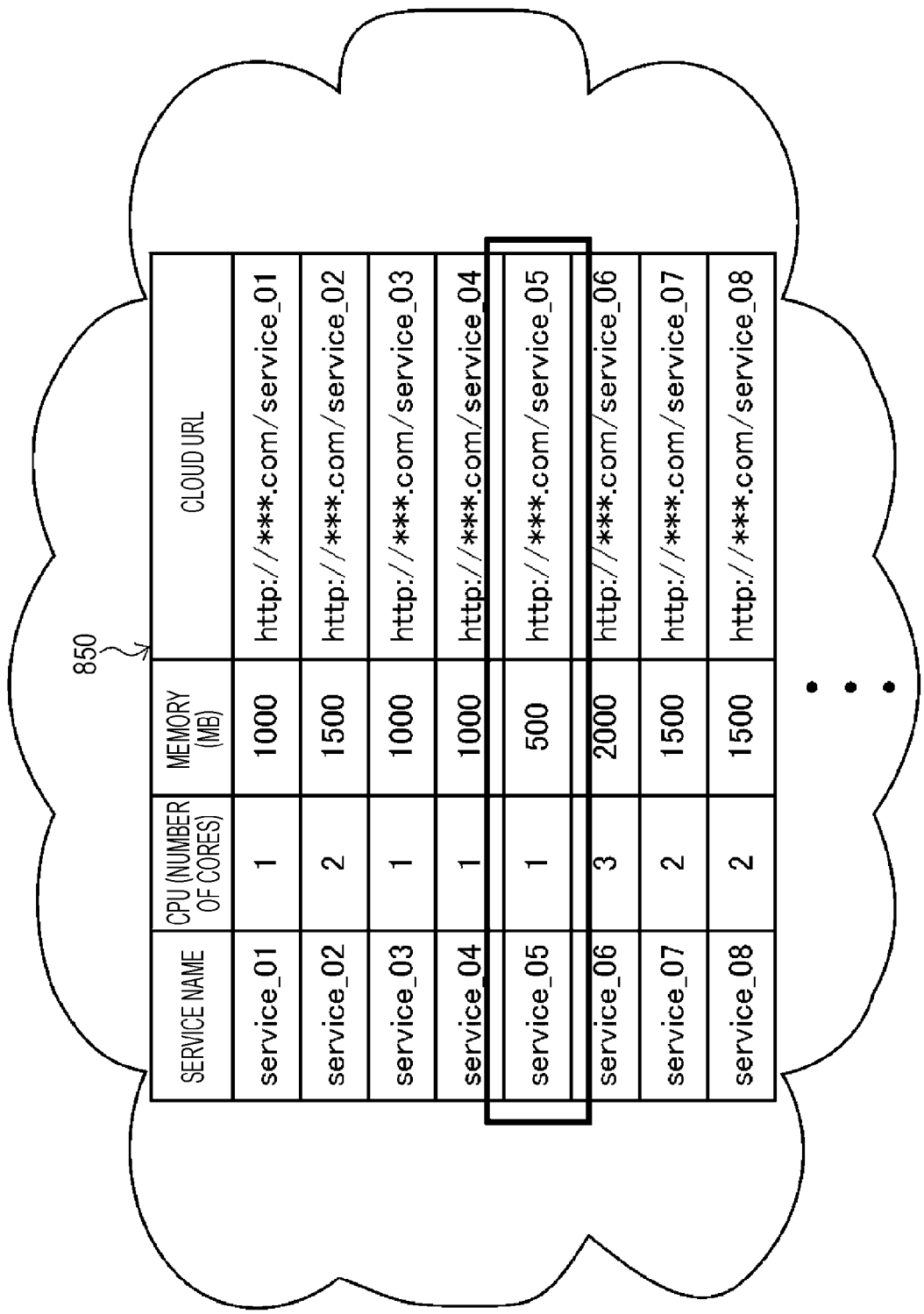
FIG. 14 is a drawing illustrating a list (service list) of services that are being executed in a cloud server.

Specifically, the server device 20 transmits, to the cloud server 80, a download request to download the execution target service on the cloud server 80 (step S31), and the cloud server 80 transmits, for example, an application for the execution target service (here, "service_05" (refer to FIG. 14)) in response to the download request (step S32). For example, service image data (data that includes an application) of the execution target service on the cloud server 80 is transmitted from the cloud server 80 to the server device 20. The server device 20 installs the execution target service in the own device by using the received data (the service image data, etc.). Subsequently, the server device 20 transmits a startup request for the execution target service installed in the own device (step S33), and starts up the execution target service ("service_05") (also refer to FIG. 15). On completion of the startup of the execution target service, the server device 20 receives a startup completion notification (step S34). Incidentally, with respect to the execution target service, it is often the case that input manipulation (setting manipulation, etc.) of inputting various matters by a user requires a relatively long time period (manipulation time period). Using such a user's manipulation time period enables the above-described installation processing or the like to progress.

In this manner, when the installation of the application for the execution target service to the own device is completed, and the execution target service starts up, the server device 20 executes processing of taking over service processing of the execution target service started in the step S14 from the cloud server 80 to the server device 20 (steps S37 to S40).

Specifically, first of all, the server device 20 transmits, to the cloud server 80, a switching request to switch to the execution target service on the server device 20 (step S37). The switching request is a request indicating that the provider device that provides the execution target service should be switched from the cloud server 80 to the server device 20.

When the cloud server 80 receives the switching request, the cloud server 80 interrupts the service provision of the execution target service. Subsequently, the cloud server 80 transmits change information (input information or the like by a user), which is information that has been changed with respect to the execution target service from the point of time at which the service has been started in the step S14 until the present time (at the point of time at which the service provision has been interrupted), to the MFP 10 (in detail, the execution target service on the server device 20) (step S38).

For example, in a case where the execution target service is a "translation service", information related to translation target data (a file name and a file path, etc.), and various setting information related to translation (including an input language, an output language, etc.), and the like, are transmitted. In addition, in a case where the execution target service is an "OCR service", information related to OCR processing target data (a file name and a file path, etc.), and various setting information related to OCR (including an OCR engine, an output file format, etc.), and the like, are transmitted. It should be noted that the change information may be transmitted to the execution target service on the server device 20 via the service management part 29f, or may be directly transmitted to the execution target service on the server device 20.

When the transmission of the change information (also referred to as "in-process information") is completed, the cloud server 80 transmits a transmission completion notification (step S39), and also transmits a completion notification of the processing related to the switching request (step S40).

Moreover, when the cloud server 80 receives a request related to the next processing from the client 90 (step S41), the cloud server 80 redirects the request to the execution target service on the server device 20 (steps S42, S43). A response after the redirection is returned from the server device 20 (step S44). From this time, a request related to the execution target service from the client 90 is transmitted to the server device 20, and a response is returned from the server device 20 to the client 90. As the result, the server device 20 provides the client 90 with the execution target service (on the server device 20) (step S45). In this manner, the server device 20 takes over, from the cloud server, the service processing that has been started by the cloud server 80 as the result of the transmission of the providing request to provide the execution target service. Subsequently, the server device 20 executes the service processing.

As described above, when it is determined that the execution target service "cannot" be provided even by using any of the plurality of applications that have already been installed in the server device 20 (step S2), the server device 20 causes the cloud server 80 to start the service processing related to the execution target service (S11 to S14), and in parallel to the processing of providing the execution target service by the cloud server 80, the server device 20 installs the application for the execution target service in the server device 20 itself to advance the preparation for service execution (S31 to S40). In addition, after the application for the execution target service is started, when the preparation for service execution is completed, the provider of the execution target service is switched from the cloud server 80 to the server device 20 (S42 to S44).

In such operation, a service corresponding to an application that is not yet installed in the server device 20 at the time of the request of the execution target service is first provided by the cloud server 80, and therefore the user is able to start using a desired service immediately (relatively in an early stage).

In addition, in parallel to the processing of providing the client 90 with the execution target service by the cloud server 80, the server device 20 downloads the application for the execution target service from the cloud server 80 to install the application in the server device 20 itself. In addition, after the completion of the installation, the server device 20 takes over, from the cloud server 80, the service processing that has been started by the cloud server 80 with respect to the execution target service, and then executes the service processing. In this manner, even if the application for the execution target service is not yet installed in the server device 20 at the time of requesting the execution target service, the application is installed in the server device 20, and the execution target service is taken over from the cloud server 80 to the server device 20 and is then executed. Therefore, the server device 20 is capable of providing not only a service that has been prepared beforehand, but also a relatively large number of services that include other services. In other words, the user is able to use a relatively large number of services provided by the server device 20.

In addition, the server device 20 (also expressed as an "on-premise server") exists at a position in the network, the position being closer from the client 90 (than the cloud server 80) (in detail, the server device 20 and the client 90 exist in the same LAN). Accordingly, the communication speed of communication between the server device 20 (device that exists in the same LAN) and the client 90 is higher (higher speed) than the communication speed of communication between the cloud server 80 (device that exists outside the LAN) and the client 90. If all services are always provided to the client 90 by the cloud server 80, a relatively low communication speed causes a large decrease in the reaction velocity. Meanwhile, according to the above-described mode, the decrease in reaction velocity in the client 90 can be suppressed.

According to such a server device 20 (the MFP 10), a relatively large number of services can be used while suppressing a decrease in reaction velocity.

In addition, when the server device 20 takes over the service processing from the cloud server 80, and then executes the service processing, the server device 20 receives service related information related to the service processing (specifically, including data (input information by the user, etc.) that has been changed during the service provision by the cloud server 80) from the cloud server 80 (step S38), and then takes over the data from the cloud server 80 and uses the data (step S45 and subsequent ones). Therefore, in a case where the provider of the service is changed from the cloud server 80 to the server device 20, it is not necessary for the user to input data again (redundant duplicate input manipulation, etc.).

It should be noted that in a case where the remaining amount (allowance) of the hardware resources of the server device 20 is small, it is preferable that the execution of a newly executed service (the "service_05", etc.) be immediately stopped at a point of time at which the use of the service ends. This enables newly execution of still another service in the server device 20. Therefore, a larger number of services can be provided by the server device 20. However, the present invention is not limited to this. A newly executed service may be kept executed continuously (in preparation for the use by still another user) even when the use of the service ends. In this case, as shown in a second embodiment described next, when a providing request to provide a service that is not being executed has been accepted, it is preferable that at least one of services that are currently being executed be brought into a non-execution state so as to reserve resources for executing the new service.

In addition, here, the specific application for providing the execution target service is downloaded from the cloud server 80 (the external device). However, the present invention is not limited to this. The application may be downloaded to the MFP 10 (the server device 20) from, for example, the external device other than the cloud server 80.

2. Second Embodiment

The second embodiment is a modified example of the first embodiment. The second embodiment will be described below focusing on points of difference from the first embodiment.

The above first embodiment has been described on the assumption that the resources (hardware resources) for newly executing a service that has not yet been executed at the time of receiving a request from the user (the step S1 (FIG. 6)) remain in the server device 20 at the time of receiving the request. In other words, the case where the resources (allowed resources) for adding a new service always exist in the server device 20 has been described.

This second embodiment describes a mode in which even in a case where the allowed resources do not exist in the server device 20 at the time of receiving the request from the user, such a case can be satisfactorily coped with.

Figure 18:
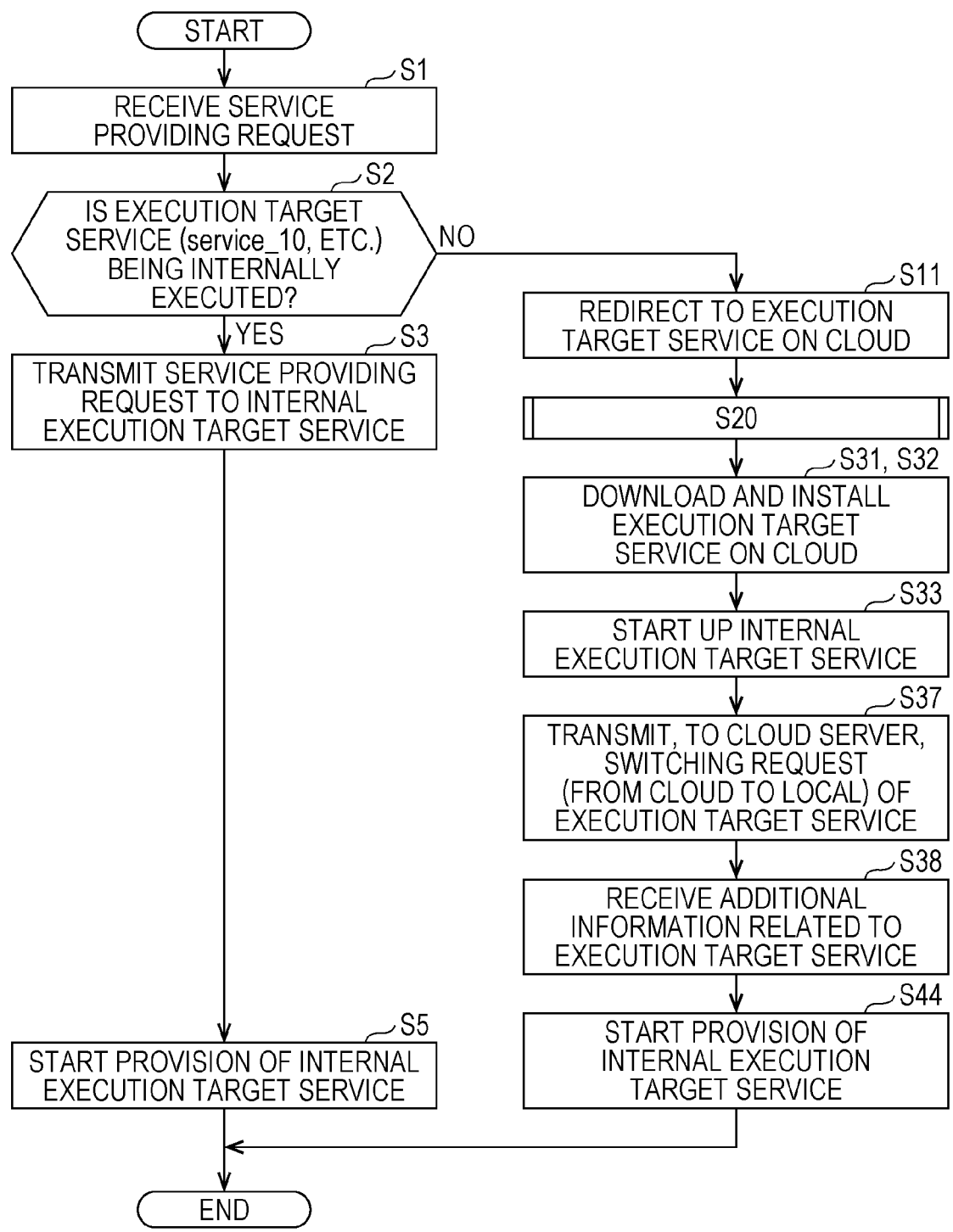
FIG. 18 is a flowchart illustrating operation of a service providing device according to the second embodiment.
Figure 19:
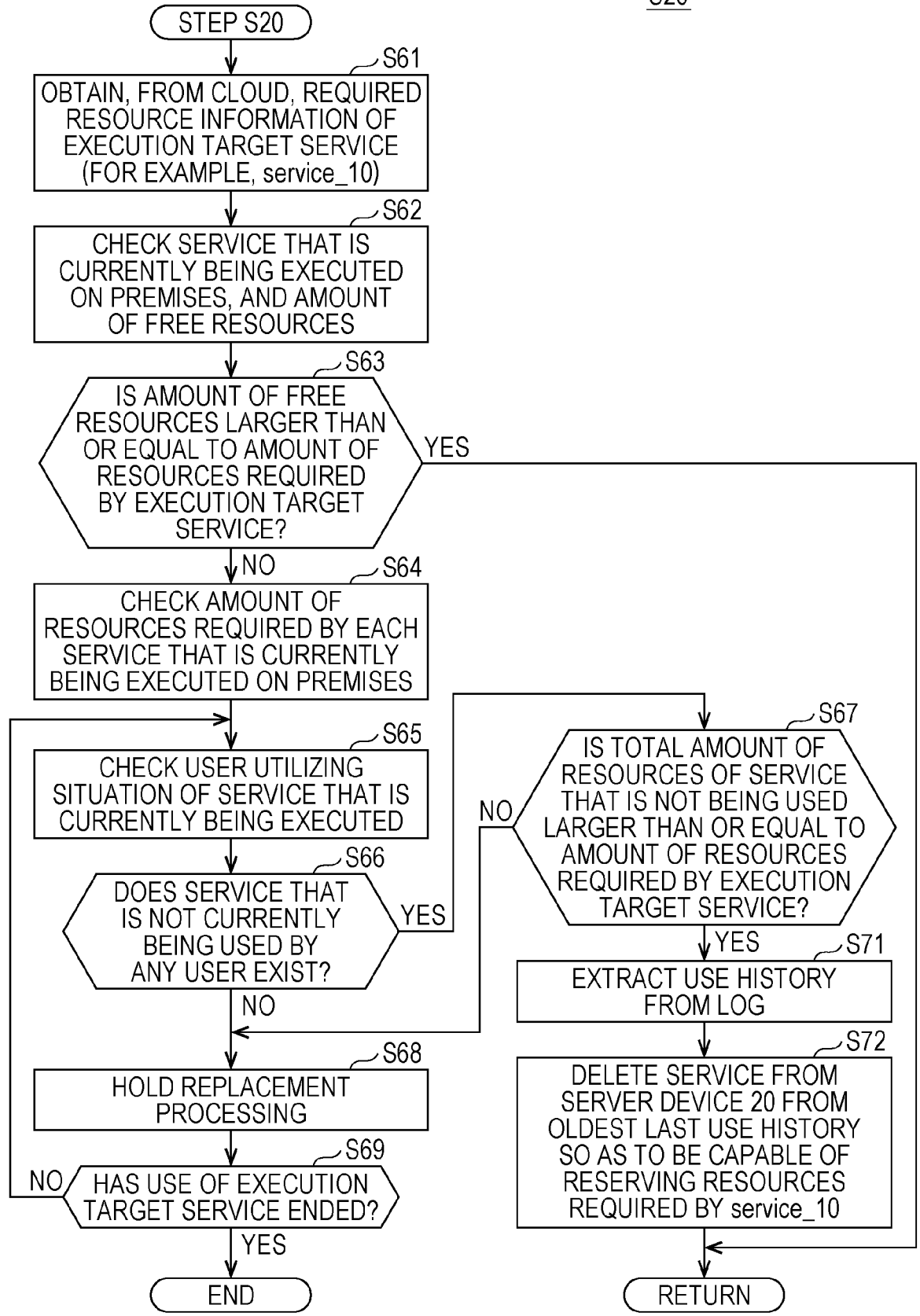
FIG. 19 is a flowchart partially illustrating detailed operation of FIG. 18.

FIGS. 18 and 19 are flowcharts each illustrating operation of the MFP 10 (the server device 20) according to the second embodiment. In the MFP 10 according to the second embodiment, the operation of FIG. 18 (and FIG. 19) is executed as an alternative to the operation of FIG. 6. It should be noted that FIG. 19 is a flowchart illustrating in detail a part (step S20) of the operation of FIG. 18.

In detail, in the second embodiment, differently from the first embodiment, the operation of the step S20 (refer to FIGS. 18 and 19) is further executed between the step S11 and the step S31.

Figure 17:
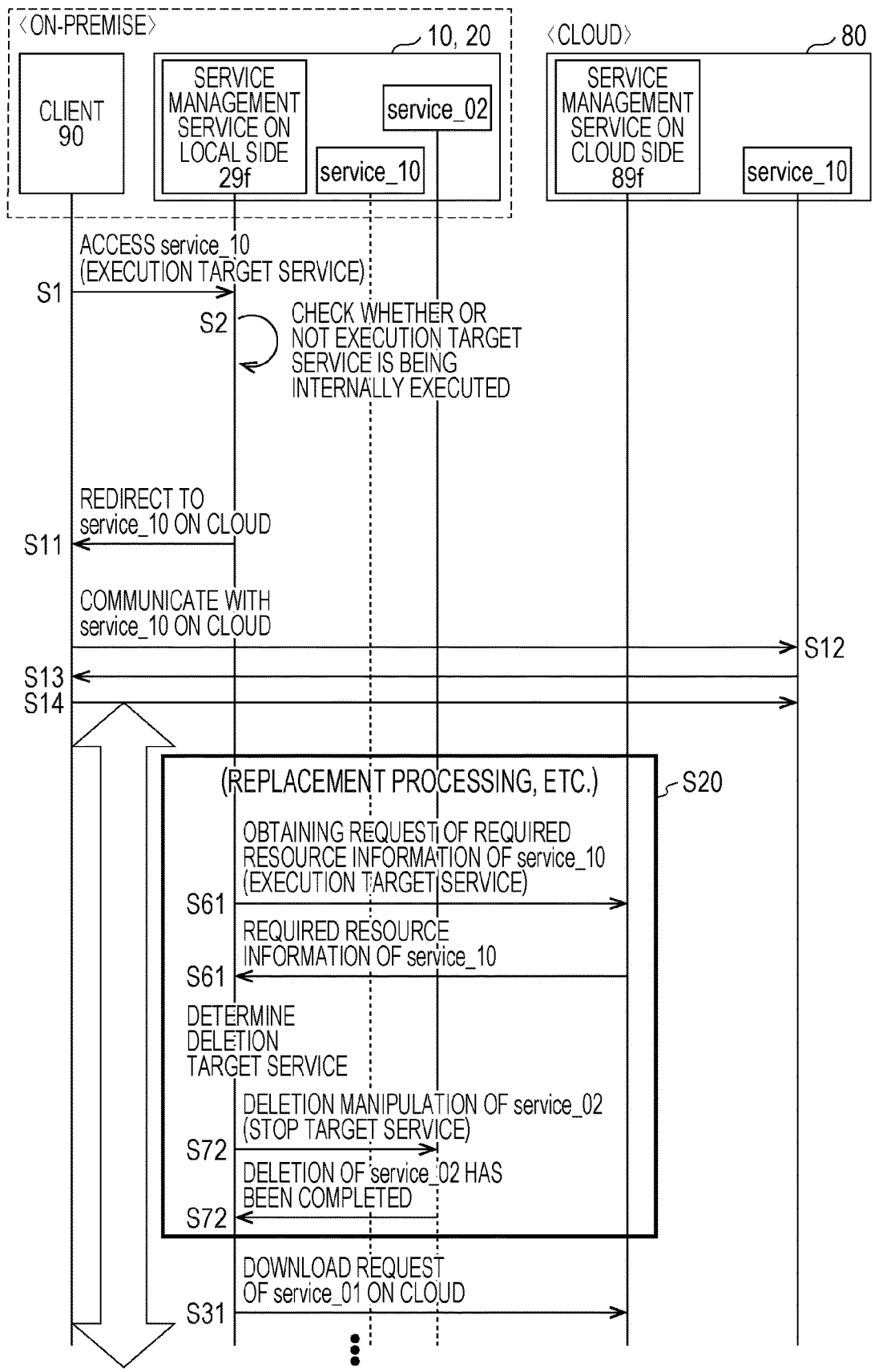
FIG. 17 is a timing chart according to a second embodiment.

As the result, in the second embodiment, the operation of FIG. 17 is executed as an alternative to the operation of FIG. 8. FIG. 17 is a timing chart illustrating a part of the operation according to the second embodiment. As understood from a comparison with FIG. 8, processing of the step S20 is executed immediately after the step S14 (refer to FIG. 17). The processing of the step S20 will be described below with reference to FIG. 19 and the like.

In the second embodiment, in a case where it is determined, in the step S2 (FIG. 18), that an execution target service cannot be immediately provided, processing of steps S11 to S14 (refer to FIG. 6, FIG. 8 and FIG. 10) is performed in a manner similar to that of the first embodiment, and subsequently the process proceeds to the step S20. It should be noted that after the step S20, processing of steps S31 to S45 (refer to FIG. 6 (FIG. 18), FIG. 9 and FIG. 11) is performed in a manner similar to that of the first embodiment.

In the step S20, processing of replacing an execution target service (a service that is not currently being executed) with a service that is currently being executed (also referred to as "replacement processing") and the like is performed. More specifically, for example, replacement processing is performed in which at least one service among a plurality of services that are being executed (a plurality of services that are using the resources of the server device 20) is brought into a non-execution state to release the resources used by the at least one service (increase free resources in the server device 20), and the execution target service is executed in the server device 20 in place of the at least one service. In short, replacement processing of deleting a part of services that is being executed, and replacing (substituting) the deleted part of services that is being executed with an execution target service to execute the execution target service, is executed. It should be noted that in the replacement processing, at least one service that is brought into a non-execution state (stopped state) (at least one service that is being executed, which is deleted from a memory or the like of the server device 20) is also referred to as a "stop target service (or deletion target service)".

Specifically, first of all, in the step S61, the MFP 10 (in detail, the service management part 29*f* of the server device 20) obtains, from the cloud server 80, resource information (also referred to as "required resource information") required for the execution of the execution target service. In more detail, as shown in FIGS. 17 and 20, the server device 20 (the service management part 29*f*) transmits an obtaining request to obtain required resource information to the cloud server 80 (in detail, the service management part 89*f* in the cloud server 80), and receives and obtains the required resource information from the service management part 89*f*.

Figure 23:
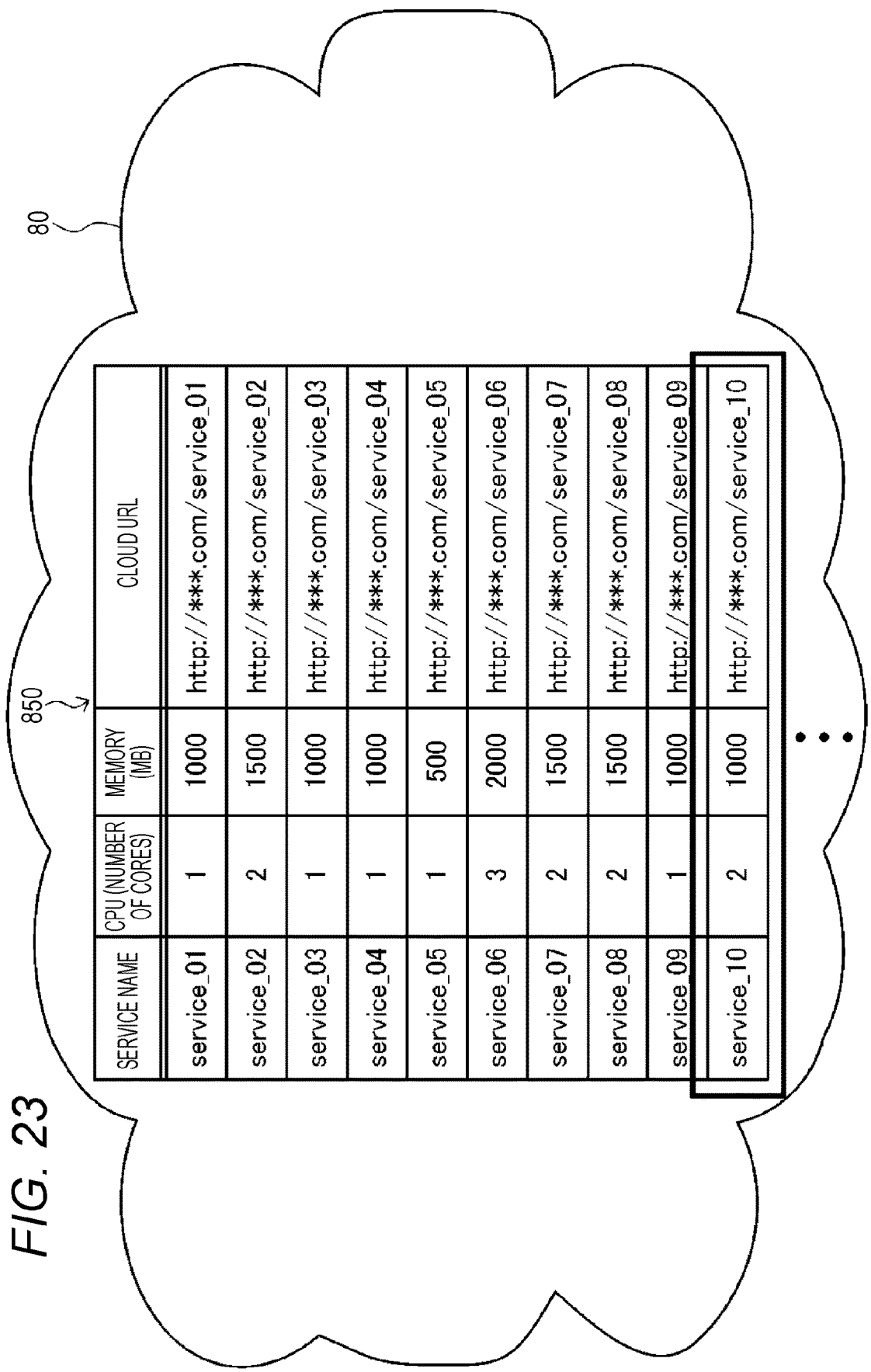
FIG. 23 is a drawing illustrating a list of services that are being executed in a cloud server.

For example, in a case where the execution target service is "service_10", required resource information (the number of CPU cores is "2", and memory is "1000" MB (megabytes)) of the "service_10" is obtained on the basis of a service list 850 (refer to FIG. 23) stored in the cloud server 80. It should be noted that the service list 850 stores various kinds of information ("service name", "the number of required CPU cores", "required memory capacity", and "address of cloud service") of each service that is being executed in the cloud server 80.

In the next step S62, the service management part 29*f* obtains information related to services that are being executed in the server device 20 (on-premise server) on the basis of the service list 250 (refer to FIG. 22). The service list 250 stores various kinds of information ("container name", "service name", "the number of used CPU cores", "used memory capacity", "address of cloud service (service provided by the cloud server 80)", "address of on-premise service (service provided by server device 20)", and "server ID") of each service that is currently being executed in the server device 20. It should be noted that the server device 20 is formed by being provided with two pieces of blade servers ("server_01" and "server_02"), and an ID of a blade server that actually executes each service is stored as a "server ID".

For example, the service list 250 of FIG. 22 shows that nine services are being executed in corresponding containers, respectively. In addition, the total amount of resources (used resources) that are being used by the nine services is calculated. Here, the total amount of used resources is calculated on a blade server basis.

Three services ("service_06" to "service_08") are being executed in the blade server "server_02", and the number of CPU cores used in the three services is "7" (=3+2+2). Therefore, the number of CPU cores used in the blade server "server_01" is "7". In addition, as shown in FIG. 25, the blade server "sewer_02" has "8" CPU cores. Therefore, the number of available CPU cores is "1" (=8−7). Incidentally, FIG. 25 is a drawing illustrating hardware resources of a server device.

In addition, six services ("service_01" to "service_05", and "service_09") are being executed in the blade server "server_01" (refer to FIG. 22), and the number of CPU cores used in the six services is "7" (=1+2+1+1+1+1). However, in addition to the six services, a service management service (and a host OS) is also being executed in the blade server "server_01". Therefore, "8" obtained by adding the number of CPU cores used by the service management service (and the host OS), which is "1", to "7" is the number of CPU cores used in the blade server "server_01". In addition, as shown in FIG. 25, the blade server "server_01" has "8" CPU cores. Therefore, the number of available CPU cores is "0" (=8−8), and thus no available CPU core exists in the blade server "server_01".

In a step S63, a determination is made as to whether or not the current amount of free resources of the server device 20 is larger than or equal to the amount of resources required by the execution target service. Specifically, the amount of free resources of each blade server is compared with the amount of resources required by the execution target service. Here, the number of CPU cores is taken into consideration as "resources". However, the present invention is not limited to this. In addition to the number of CPU cores (or as an alternative to the number of CPU cores), the required memory amount or the like may be taken into consideration.

In a case where the amount of free resources of the server device 20 is larger than or equal to the amount of resources required by the execution target service, the process proceeds from the step S63 to the step S31 (FIG. 6), and the operation similar to that of the first embodiment is executed.

For example, as shown in FIG. 21, in a case where the service "service_09" is going to be executed as an execution target service during the execution of eight services ("service_01" to "service_08") in the server device 20, the number of CPU cores that are available in the server device 20 is "2" (the blade servers "server_01" and "server_02" each have "1"), and the number of CPU cores required by the execution target service "service_09" is "1". In this case, it is determined that the amount of free resources of the server device 20 is larger than or equal to the amount of resources required by the execution target service. Therefore, the process proceeds to the step S31 (without proceeding to a step S64 described next). In addition, processing of the step S31 and subsequent ones is executed, and consequently the execution target service "service_09" is executed by the server device 20 (for example, the blade server "server_01"). Thus, provision of the execution target service "service_09" by the server device 20 is started.

Meanwhile, in a case where the amount of free resources of the server device 20 is smaller than the amount of resources required by the execution target service, the process proceeds from the step S63 to the step S64. For example, in a case where the number of CPU cores required by the desired execution target service "service_10", which is "2", is larger than the total number of free resources (here, the number of free CPU cores), which is "1" (refer to FIG. 22), it is determined that the amount of free resources of the server device 20 is smaller than the amount of resources required by the execution target service, and the process proceeds to the step S64.

In the step S64, the service management part 29*f* checks the amount of resources required by each service that is being executed in the server device 20 at the present point of time (also referred to as a "service that is being executed").

Moreover, the service management part 29*f* checks a utilizing situation (use situation) of a user of each service that is being executed (step S65), and determines whether or not "among services that are being executed, a service that is not currently being used by any user" (also referred to as service that is not being used (or a service that is not being utilized)) exists (step S66).

In a case where it is determined that a service that is not being used does not exist, the process proceeds to the step S68, and starting of service replacement processing is held. In branch processing of the next step S69, when the use of the execution target service has not yet been ended, the process returns to the step S65.

Meanwhile, when the use of execution target service is ended, the present processing is ended. In this manner, on condition that the use of the execution target service has not yet been ended, the processing of the steps S65, S66 and S68 is repeated until any service that is not being used occurs. In other words, in a case where a service that is not being used does not exist in services that are currently being executed in the server device 20, replacement processing (steps S72, S31 to S34, etc.) is held.

Meanwhile, in a case where it is determined that a service that is not being used exists, the process proceeds to a step S67.

In the step S67, a determination is made as to whether or not the total amount of resources of the service that is not being used is larger than or equal to the amount of resources required by the execution target service.

In a case where the total amount of resources of the service that is not being used is smaller than the amount of resources required by the execution target service, the process proceeds to the step S68. In this case as well, the replacement processing (the steps S72, S31 to S34, etc.) is held.

Meanwhile, in a case where the total amount of resources of the service that is not being used is larger than or equal to the amount of resources required by the execution target service, the server device 20 determines a "stop target service (deletion target service)" in the replacement processing from among services that are being executed (in detail, from among services that are not being used) (step S72). In more detail, the server device 20 obtains a use history of services (step S71), and determines, on the basis of the use history, a stop target service (a service that should be stopped by being brought into a non-execution state) in the replacement processing (step S72). It should be noted that in a case where the number of services that are not being used is only one, the one service that is not being used is determined as the stop target service. In addition, in a case where a plurality of services that are not being used exist, the stop target service in the replacement processing is determined on the basis of the use history.

Here, from among services that are currently being executed and are not being used in the MFP 10 (the server device 20), the "stop target service" is determined on the basis of information indicating a last used time point. In more detail, from among services that are currently being executed and are not being used in the MFP 10, a service, the last used time point (the last used date and time) of which is the most previous, is determined as the "stop target service". For example, in a case where a service that is not being used, the last used time point of which is "five minutes ago", and a service that is not being used, the last used time point of which is "one week ago", exist among the services that are currently being executed, the service, the last used time point of which is "one week ago", is determined as the stop target service. In this manner, a service, the unused time period of which is the longest, is determined as the stop target service.

For example, in a case where a plurality of services including the service "service_02" in FIG. 22 are services that are not being used, the total amount of resources of the services that are not being used (the number of CPU cores is "2" or more) is larger than or equal to the amount of resources required by the execution target service (the number of CPU cores is "1"). Therefore, the process proceeds from the step S67 to the steps S71, S72. Subsequently, in a case where the service "service_02" is a service, the last used time point (the last used date and time) of which is the most previous, among the plurality of services that are being executed and are not being used, the service "service_02" is determined as the "stop target service".

However, the present invention is not limited to this. A service, the elapsed time period from the last used time point of which is longer than a predetermined time period, is extracted from among services that are currently being executed and are not being used in the MFP 10, and a "stop target service" may be selected (determined) from among the extracted one or more services. In a case where a plurality of services is extracted, a service, the last used time point of which is the most previous thereamong, may be selected as the "stop target service", or a user may be allowed to select a "stop target service" from among the plurality of services.

Alternatively, from among services that are currently being executed and are not being used in the MFP 10 (the server device 20), a "stop target service" may be determined on the basis of information indicating a use count during a predetermined past time period. In more detail, from among services that are currently being executed and are not being used in the AFP 10, a service, the use count during the predetermined past time period of which is the smallest (a service, the use frequency thereof is the lowest) may be determined as the stop target service. For example, in a case where a service that is not being used, the use count in the past three months of which is "100 times", and a service that is not being used, the use count in the past three months of which is "5 times", exist among the services that are currently being executed, the service, the use count in the past three months of which is "5 times", is determined as the stop target service. In this manner, the service, the use frequency thereof is the lowest, may be determined as the stop target service. Alternatively, a service, the use count during the predetermined past time period of which is smaller than a predetermined number of times, is extracted, and a "stop target service" may be selected therefrom. In a case where a plurality of services is extracted, a service, the use count of which is the smallest thereamong, may be selected as the "stop target service", or a user may be allowed to select a "stop target service" from among the plurality of services.

Alternatively, from among services that are currently being executed and are not being used in the AFP 10 (the server device 20), a "stop target service" may be determined on the basis of information indicating the number of users who have used the service during a predetermined past time period. In more detail, from among services that are currently being executed and are not being used in the AFP 10, a service, in which the number of users who have used the service during the predetermined past time period is the smallest (a service, in which the number of users who have ever used the service during the predetermined past time period is the smallest) may be determined as the stop target service. For example, in a case where a service that is not being used, the number of users who have used the service in the past three months being "5", and a service that is not being used, the number of users who have used the service in the past three months being "1", exist among the services that are currently being executed, the service that is not being used, the number of users who have used the service in the past three months being "1", is determined as the stop target service. In this manner, a service, in which the number of users who have used the service in the past is the smallest, may be determined as the stop target service. Alternatively, a service, in which the number of users who have used the service during the predetermined past time period is smaller than a predetermined number, is extracted, and a "stop target service" may be selected therefrom. In a case where a plurality of services is extracted, a service, in which the number of users who have used the service is the smallest thereamong, may be selected as the "stop target service", or a user may be allowed to select a "stop target service" from among the plurality of services. It should be noted that the predetermined past time period may be the entire past time period.

As the result of such processing, at least one service (for example, one service "service_02") is determined as the stop target service. In more detail, at least one service, in which the total amount of resources (occupied resources) used by the service is larger than the amount of resources required for the provision of the execution target service, is determined as the stop target service from among the services that are being executed (in more detail, from among services that are not being used).

Incidentally, here, although the stop target service is determined from among services that are not being used, the present invention is not limited to this. The stop target service may be determined from among a plurality of services that are being executed and include a service that is being used.

Subsequently, the server device 20 brings the service that has been determined as the stop target service into a non-execution state from an execution state, and then stops the service (step S72). In short, the stop target service (deletion target service) is deleted from the server device 20.

In addition, operation in the step S31 and subsequent ones (refer to FIG. 18, FIG. 9 and FIG. 11) is executed in a manner similar to that of the first embodiment. Consequently, provision of the execution target service "service_10" by the server device 20 is started. The service list 250 of FIG. 24 shows a state in which the stop target service "service_02" is stopped in the server device 20 (step S72), and execution of the execution target service "service_10" has been started in the server device 20 (step S44) (in exchange for stopping of the service "service_02").

As described above, the operation of providing the execution target service by the server device 20 is executed while being accompanied by the replacement processing. As the result of being accompanied by such replacement processing, even in a case where allowed resources do not exist in the server device 20 at the time of receiving a request from a user, such a case can be satisfactorily coped with by effectively utilizing the resources of the server device 20. Specifically, the execution target service can be executed in exchange for the stop target service in the server device 20.

In addition, from among services that are being executed, a service that is not being used is determined as a stop target service. Therefore, the stop target service can be executed while suppressing the influence on the other services.

Moreover, among the services that are not being used, for example, a service that is not used for a long period of time, a service, the use frequency thereof is low, or a service, in which the number of users who have used the service in the past is small, is determined as the stop target service. Therefore, the stop target service can be executed while more properly suppressing the influence on the other services.

In addition, in the above-described operation (in particular, the steps S66, S67 to S72, etc.), after a point of time at which holding of replacement processing has been once determined (step S66) on the basis of a state in which a service that is not used (service that is not being used) does not exist, in a case where one or more services that having been used at that point of time have gotten out of use after that point of time (in a case where the use of services that are being used ends), in response to the case, the process proceeds from the step S66 to the step S67. In this case, also on condition that the total amount of resources of the services that are not being used is larger than or equal to the amount of resources required by the execution target service, holding of the replacement processing (steps S72, S31 to S34, etc.) is released, and the replacement processing is started (steps S67, S71, S72). This enables execution of the replacement processing more properly in consideration of a change with time in the use situation in the server device 20 as well.

Moreover, in the step S72, it is preferable that the server device 20 upload, to the cloud server 80, data related to the stop target service which is brought into the non-execution state (execution stopped state) from the execution state, the data having been changed during the execution time period before being brought into the non-execution state, and that the server device 20 causes the cloud server 80 to manage the data. As the data that has been changed when the stop target service having been executed in the service providing device 10 (data that has been changed during the execution time period before being brought into the non-execution state), for example, charging information, input information by the user, use history information of the user and the like are presented.

Consequently, data that has been changed on the local side (the server device 20) is properly reflected on the cloud side (the cloud server 80), and therefore, when the stop target service is executed in the cloud server 80 again, data inconsistency between the cloud server 80 and the service providing device 10 can be avoided.

3. Modified Examples, Etc

Although embodiments of the present invention have been described above, the present invention is not limited to the contents described above.

<Parallel Download Processing>

For example, the above-described second embodiment shows a mode in which in a case where a service that is not currently being used in the server device 20 does not exist (YES in the step S66 (FIG. 19)), replacement processing is held until a service that is not being used occurs (step S68), and therefore a stop target service cannot be determined. However, the present invention is not limited to this.

Specifically, in a case where a service that is not currently being used in the server device 20 does not exist, with the result that a stop target service cannot be determined, the server device 20 may be adapted to start downloading of an application for executing an execution target service, and thereby advancing the preparation for starting the execution of the execution target service (in the step S68, etc.). Subsequently, when a service, the use of which has ended in the server device 20, occurs, the server device 20 may determine the service, the use of which has ended, as a stop target service, and in exchange for stopping of execution of the stop target service, the server device 20 may start the execution of the execution target service by using the application for executing the execution target service. More specifically, in a case where downloading of the application for execution has already been completed at a point of time at which the execution of the stop target service has been stopped, the downloaded application for execution has only to be installed and started up. Alternatively, in a case where downloading of the application for execution has not yet been completed at the point of time at which the execution of the stop target service has been stopped, the downloading is continued, and the application for execution has only to be installed and started up immediately after the completion of the downloading. Moreover, subsequently, processing in the steps S37, S38 (receiving operation of receiving a switching request of the execution target service, service related information related to the execution target service, etc.) has only to be executed.

According to such operation, the application download processing progresses earlier than a point of time at which a stop target service is determined (step S72). Therefore, the download processing can be ended earlier than the mode in which the download processing is started from the step S31, and furthermore, the execution target service can be taken over from the cloud server 80 to the server device 20 in an early stage.

<Stop Target Service>

In addition, each of the embodiments described above shows a mode in which all services that are being executed by the server device 20 in the MFP 10 may be a stop target service (deletion target service). However, the present invention is not limited to this. For example, a stop target service may be determined from among services excluding predetermined exclusion target services (exclusion target services specified beforehand). As the predetermined exclusion target service, a service that is preferably always operated in the server device 20 (not on the cloud server 80 side) is presented. For example, basic operation services of the imaging forming device 30 in the MFP 10 (in detail, a print service, a scan service, a copy service, a facsimile service, etc.) are presented. In addition, a mail service that should reside in the server device 20 is also presented. When a stop target service is determined from among services excluding the exclusion target services, an execution state of the exclusion target service in the server device 20 can be properly continued.

<Taking Over User Data>

In addition, in each of the embodiments described above, when it is determined that service processing is taken over from the cloud server 80 and is then executed, the server device 20 receives service related information in the step S38 (refer to FIGS. 6 and 9), and executes the service processing by taking over the service related information as well. The service related information may include data related to all of a plurality of users. However, the present invention is not limited to this. Including only data related to a part of the plurality of users suffices.

For example, in the step S38, the server device 20 identifies users who are currently using the execution target service (service to be taken over), and may download only data related to the currently using users (U1, U2) from among data related to the plurality of users (U1, U2, U3, etc.) of the execution target service.

Moreover, after downloading of data related to the users who are currently using the execution target service is completed (more preferably, after the step S44), the server device 20 may start (execute) downloading of data related to users (U3, etc.) other than the currently using users. In this manner, data of the currently using users (U1, U2) may be downloaded with higher priority than data of the other users (U3, etc.).

Alternatively, after data related to the currently using users (also referred to as "first use target users") (U1, U2) is downloaded in the step S38, in response to accept, from second use target users (U5, etc.) that are different from the first use target users, a providing request to provide the same execution target service, the server device 20 may download data related to the second use target users (U5, etc.).

<Kinds of Download Target Data, Etc.>

As described above, in each of the above-described embodiments, when it is determined that service processing is taken over from the cloud server 80 and is then executed, the server device 20 receives service related information in the step S38 (refer to FIGS. 6 and 9), and executes the service processing by taking over the service related information as well.

Although the service related information may include all kinds of data, the present invention is not limited to this. The service related information may include only a part of the kinds of data. In other words, information that is managed on the local side (the server device 20) may be a part of kinds of information.

As information (data) that is managed on the local side (the server device 20 side), for example, information (print setting information on a login user basis, and path information of file saving destination on a login user basis, etc.) that is associated with login information is presented. In addition, thumbnail image information related to screen manipulation (for example, thumbnail image information in a specific folder), and status information (printing accepted, image being converted, printing being executed, error has occurred, successfully completed) in polling monitoring processing, and the like, are presented. These pieces of information have characteristics of being information that is frequently accessed (and/or information that is easily exposed to user's eyes, for example, by being displayed on a screen). Therefore, in order to suppress a decrease in reaction velocity resulting from data communication thereof, it is preferable that these pieces of information be managed on the local side (on the on-premise side).

Meanwhile, it is preferable that information for which the consistency between a series of processing is required at a higher level than a predetermined level (information for which inconsistency between a series of processing should be avoided) and the like be collectively managed by the cloud server 80 rather than be managed by a plurality of local-side servers (the plurality of server devices 20, etc.). For example, it is preferable that data (transaction data) related to transaction processing (an inseparable processing group such as reception and payment processing (money reception processing and payment processing)) be managed not on the server device 20 side, but by the cloud server 80. For example, these pieces of information (data related to transaction processing, etc.) have only to be excluded from the download target in the step S38, so as to be managed by the cloud server 80. Specifically, a change request of the information is successively transmitted from the server device 20 to the cloud server 80 in the communication in the step S45 and subsequent ones, and management information in the cloud server 80 has only to be successively updated (changed) according to the change request.

In this manner, the service providing system 1 may be configured in such a manner that the server device 20 does not download (manage) a part of specific data (transaction data, etc.) among pieces of data related to the execution target service, and the cloud server 80 manages the part of specific data.

<Upload Timing>

In each of the embodiments described above, data that has been changed during a service provision time period by the server device 20 is uploaded from the server device 20 to the cloud server 80 when the execution is stopped in the server device 20 (step S72). However, the present invention is not limited to this.

For example, the server device 20 may transmits data, which is changed during the service provision time period of the execution target service provided by the server device 20, to the cloud server 80 consecutively (every time the data is changed) during an execution time period of the execution target service (during an execution time period that is before the step S1, and during an execution time period that is in the step S45 and subsequent ones, etc.), so as to cause the cloud server 80 to store (manage) the data therein.

Alternatively, the server device 20 may collectively transmit data, which is changed during the service provision time period of the execution target service provided by the server device 20, to the cloud server 80 at a point of time at which the use of the execution target service by each user has ended (in detail, a point of time at which each user has logged out according to user's manipulation, and/or at the time of forced log out based on an elapse of a constant no manipulation time period by each user (at the time of session timeout) etc.), so as to cause the cloud server 80 to store (manage) the data therein.

OTHERS

In addition, in each of the above-described embodiments and the like, resources related to the CPU are expressed by the number of CPU cores. However, the present invention is not limited to this. The resources related to the CPU may be expressed by, for example, a usage rate (%) of the CPU.

Moreover, in each of the above-described embodiments, what is called a personal computer or the like is presented as the client 90. However, the present invention is not limited to this. For example, the client 90 may be an MFP that differs from the above-described MFP 10. The different MFP may be a conventional MFP that does not include the server device 20.

Although embodiments of the present invention have been described and illustrated in detail, the disclosed embodiments are made for purposes of illustration and example only and not limitation. The scope of the present invention should be interpreted by terms of the appended claims

What is claimed is:

1. A service providing device comprising
a hardware processor that:
accepts a providing request of one service from a client which is connected with the service providing device through a network and arranged in a same LAN as the service providing device;
determines whether or not the one service can be provided by using any of a plurality of applications installed in the service providing device; and
controls service processing corresponding to the providing request of the one service, wherein
in a case where it is determined that the one service can be provided by using any of the plurality of applications, the hardware processor uses, among the plurality of applications, an application corresponding to the one service to start the service processing corresponding to the providing request of the one service to provide the client with the one service, and
in a case where it is determined that the one service cannot be provided even by using any of the plurality of applications, the hardware processor transmits the providing request of the one service to an external server that is another service providing device different from the service providing device and arranged outside the LAN, so as to cause the external server to start the service processing corresponding to the providing request to provide the client with the one service, and downloads a specific application for providing the one service from the external server or another external device to install the specific application in the service providing device, after the installation of the specific application to the service providing device is completed, takes over, from the external server, the service processing that has been started by the external server resulting from the transmission of the providing request of the one service, and then executes the service processing to provide the client with the one service.

2. The service providing device according to claim 1, wherein
in a case where it is determined that the one service cannot be provided by using any of the plurality of applications, the hardware processor brings at least one service that is being executed in the service providing device into a non-execution state to release resources used by the at least one service, and executes replacement processing that is processing of executing the one service in the service providing device in place of the at least one service.

3. The service providing device according to claim 2, wherein
the hardware processor determines at least one service, the total amount of resources of which is larger than the amount of resources required to provide the one service, as a stop target service that should be brought into the non-execution state and is stopped in the replacement processing, from among executing services that are currently being executed in the service providing device.

4. The service providing device according to claim 2, wherein
the stop target service that should be brought into the non-execution state and is stopped in the replacement processing is determined from among services that are not currently being used by any user in the service providing device.

5. The service providing device according to claim 4, wherein
the hardware processor determines the stop target service, from among services that are currently being executed and are not being used in the service providing device, on the basis of information indicating a last used time point.

6. The service providing device according to claim 4, wherein
the hardware processor determines the stop target service, from among services that are currently being executed and are not being used in the service providing device, on the basis of information indicating a use count during a predetermined past time period.

7. The service providing device according to claim 4, wherein
the hardware processor determines the stop target service, from among services that are currently being executed and are not being used in the service providing device, on the basis of information indicating the number of users who have used the service during a predetermined past time period.

8. The service providing device according to claim 4, wherein
in a case where a service that is not currently being used does not exist among services that are currently being executed in the service providing device, the hardware processor holds the replacement processing.

9. The service providing device according to claim 8, wherein
after a point of time at which it has been determined, on the basis of a state in which a service that is not being used does not exist, that the replacement processing is held, the hardware processor releases holding of the replacement processing to start the replacement processing on condition that the service having been used at the point of time has gotten out of use after the point of time.

10. The service providing device according to claim 4, wherein
in a case where a service that is not currently being used in the service providing device does not exist, with the result that the stop target service cannot be determined, the hardware processor starts downloading of the specific application corresponding to the one service to advance preparation for starting execution of the one service, and when a service, the use of which has ended in the service providing device, occurs, the hardware processor determines the service, the use of which has ended, as a stop target service, and starts the execution of the one service using the specific application in exchange for stopping of the stop target service.

11. The service providing device according to claim 2, wherein
the stop target service that should be brought into the non-execution state and is stopped in the replacement processing is determined from among services excluding predetermined replacement exclusion target services.

12. The service providing device according to claim 2, wherein
among data related to the stop target service that should be brought into the non-execution state and is stopped in the replacement processing, the hardware processor uploads, to the external server, data that has been changed during an execution time period before the stop target service is brought into the non-execution state, and causes the external server to manage the data.

13. The service providing device according to claim 1, wherein
when the service processing is taken over from the external server and is then executed, service related information related to the service processing is also taken over from the external server, and is used.

14. The service providing device according to claim 13, wherein
when it is determined that the service processing is taken over from the external server and is then executed, the hardware processor identifies a user who is currently using the one service, and downloads data related to the currently using user from among data related to a plurality of users of the one service.

15. The service providing device according to claim 14, wherein
after downloading of the data related to the user who is currently using the one service is completed, the hardware processor starts downloading of data related to users other than the user who is currently using the one service.

16. The service providing device according to claim 14, wherein
after data related to a first use target user that is the user who is currently using the one service is downloaded from among data related to the plurality of users of the one service, in response to accept a providing request of the one service from a second use target user that is different from the first use target user, the hardware processor downloads data related to the second use target user.

17. The service providing device according to claim 1, wherein
when the service processing is taken over from the external server and is then executed, the hardware processor downloads, from the external server, a part of data including data related to screen manipulation from among data related to the one service, and then takes over the part of data.

18. The service providing device according to claim 1, wherein
when the service processing is taken over from the external server and is then executed, the hardware processor downloads, from the external server, a part of data including status data for polling and displaying a status related to the service providing device from among data related to the one service, and then takes over the part of data.

19. The service providing device according to claim 1, wherein
when the service processing is taken over from the external server and is then executed, the hardware processor does not download a part of specific data managed by the external server from among data related to the one service, and excludes the part of specific data from target data to be taken over in the service processing.

20. The service providing device according to claim 19, wherein
the part of specific data includes transaction data.

21. The service providing device according to claim 1, wherein
the hardware processor successively transmits data that is provided by the service providing device, and that is changed in the one service, to the external server, and causes the external server to store the data.

22. The service providing device according to claim 1, wherein
the hardware processor collectively transmits data that is provided by the service providing device, and that is changed in the one service, to the external server at a point of time at which the use of the one service by the user has ended, and causes the external server to store the data.

23. A non-transitory recording medium storing a computer readable program causing a computer built into a service providing device to perform:
   a) accepting a providing request of one service from a client which is connected with the service providing device through a network and arranged in a same LAN as the service providing device;
   b) determining whether or not the one service can be provided by using any of a plurality of applications installed in the service providing device; and
   c) controlling service processing corresponding to the providing request of the one service, wherein
   the c) includes:
      c-1) in a case where it is determined that the one service can be provided by using any of the plurality of applications, using, among the plurality of applications, an application corresponding to the one service to start the service processing corresponding to the providing request of the one service to provide the client with the one service; and
      c-2) in a case where it is determined that the one service cannot be provided even by using any of the plurality of applications, transmitting the providing request of the one service to an external server that is another service providing device different from the service providing device and arranged outside the LAN, so as to cause the external server to start the service processing corresponding to the providing request to provide the client with the one service, and downloading a specific application for providing the one service from the external server or another external device to install the specific application in the service providing device, after the installation of the specific application to the service providing device is completed, taking over, from the external server, the service processing that has been started by the external server resulting from the transmission of the providing request of the one service, and then executing the service processing to provide the client with the one service.

* * * * *